(12) United States Patent
Ishii et al.

(10) Patent No.: US 8,248,485 B2
(45) Date of Patent: Aug. 21, 2012

(54) IMAGING APPARATUS AND IMAGING METHOD

(75) Inventors: Yasunori Ishii, Osaka (JP); Yusuke Monobe, Kyoto (JP); Yasunobu Ogura, Osaka (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 12/668,701

(22) PCT Filed: May 13, 2009

(86) PCT No.: PCT/JP2009/002078
§ 371 (c)(1),
(2), (4) Date: Jan. 12, 2010

(87) PCT Pub. No.: WO2009/139154
PCT Pub. Date: Nov. 19, 2009

(65) Prior Publication Data
US 2010/0194919 A1    Aug. 5, 2010

(30) Foreign Application Priority Data

May 14, 2008 (JP) .................................. 2008-127386

(51) Int. Cl.
*H04N 5/228* (2006.01)
*H04N 5/222* (2006.01)
*H04N 9/73* (2006.01)
*G06K 9/40* (2006.01)
*G03F 3/08* (2006.01)

(52) U.S. Cl. .................. 348/222.1; 348/371; 348/225.1; 348/221.1; 382/167; 382/162; 382/274; 358/518; 358/515

(58) Field of Classification Search ............... 348/222.1, 348/221.1, 223.1, 225.1, 224.1, 234, 272, 348/277, 280; 382/162, 167, 274; 358/515, 358/516, 518

See application file for complete search history.

(56) References Cited

U.S. PATENT DOCUMENTS
5,568,194 A * 10/1996 Abe .......................... 348/223.1
(Continued)

FOREIGN PATENT DOCUMENTS
JP   8-051632   2/1996
(Continued)

OTHER PUBLICATIONS

International Search Report issued Aug. 18, 2009 in International (PCT) Application No. PCT/JP2009/002078.

*Primary Examiner* — Jason Whipkey
*Assistant Examiner* — Marly Camargo
(74) *Attorney, Agent, or Firm* — Wenderoth, Lind & Ponack, LLP.

(57) ABSTRACT

Acquiring enough brightness with flash and obtaining an image having a color close to a color which a human senses. An imaging apparatus (10) which emits a flash and photographs an object (20) includes: a lighting unit (11) which emits the flash to the object; an image obtaining unit (12) which obtains continuously-captured images including a first image and a second image by photographing the object (20) while the lighting unit (11) is emitting the flash, the second image having luminance greater than luminance of the first image; a color information obtaining unit (14) which obtains, from the first image, color information of a first color vector; a luminance information obtaining unit (15) which obtains, from the second image, luminance information of a second color vector; and an image generating unit (17) which generates a corrected image by generating a third color vector corresponding to the color information of the first color vector and the luminance information of the second color vector, the corrected image having luminance greater than the luminance of the first image.

17 Claims, 24 Drawing Sheets

U.S. PATENT DOCUMENTS

| | | | |
|---|---|---|---|
| 6,125,199 A * | 9/2000 | Sato et al. | 382/162 |
| 6,963,362 B1 * | 11/2005 | Nakayama | 348/224.1 |
| 7,071,987 B1 * | 7/2006 | Tanaka | 348/362 |
| 7,903,896 B2 * | 3/2011 | Yamada | 382/254 |
| 2007/0165960 A1 | 7/2007 | Yamada | |

FOREIGN PATENT DOCUMENTS

| | | |
|---|---|---|
| JP | 9-160103 | 6/1997 |
| JP | 2000-050152 | 2/2000 |
| JP | 2003-296720 | 10/2003 |
| JP | 2005-102116 | 4/2005 |
| JP | 2007-266926 | 10/2007 |

* cited by examiner

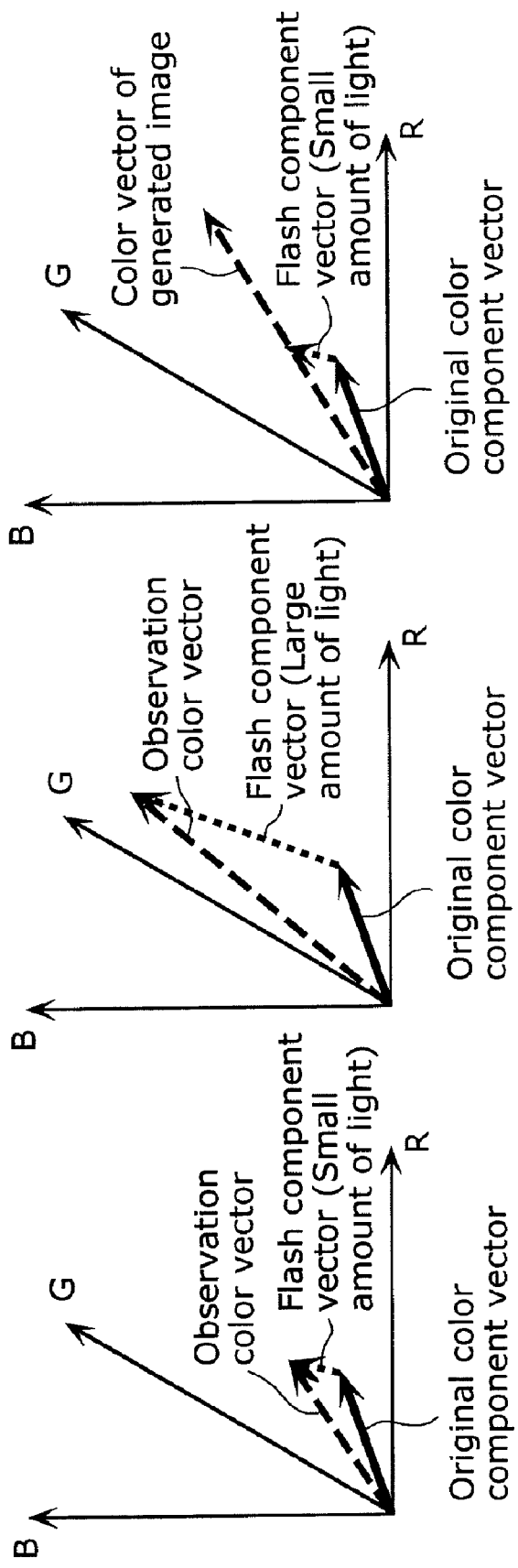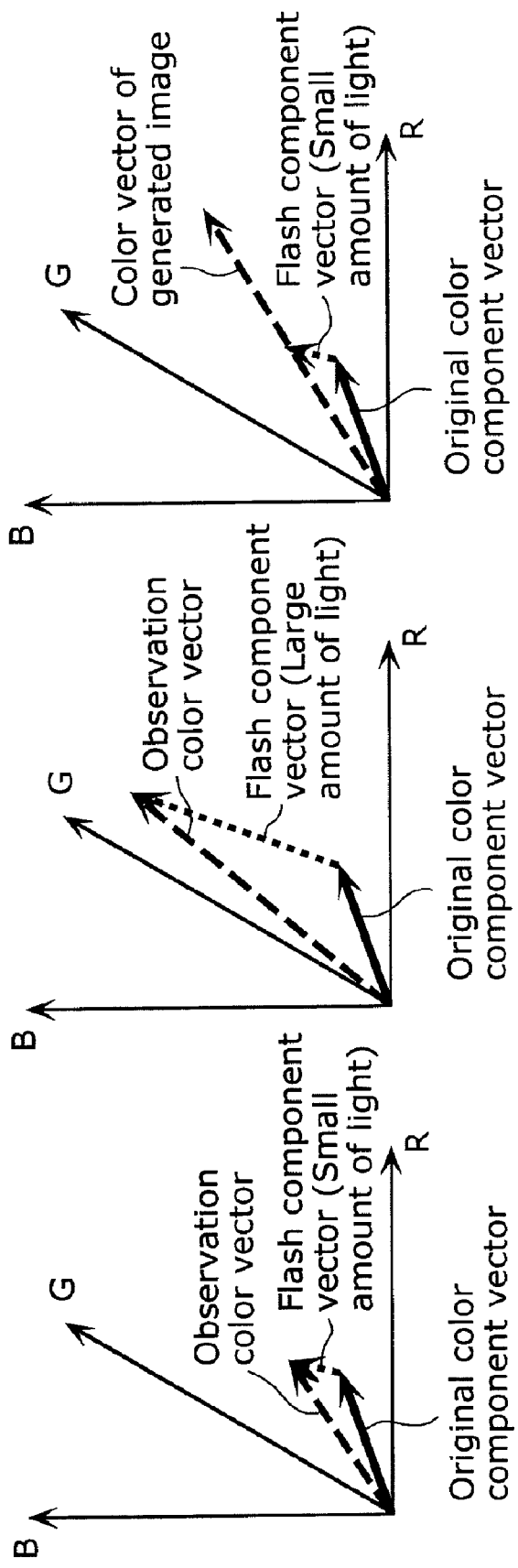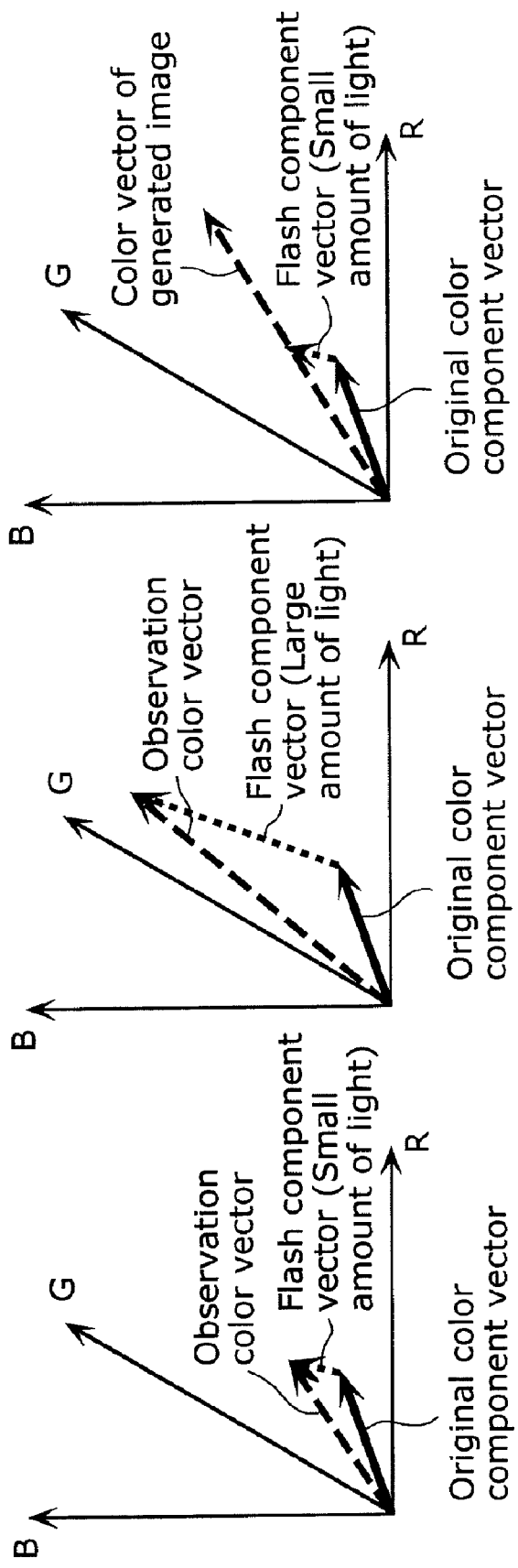

Amount of light: Small

Amount of light: Large

FIG. 16

| MIN | | | MAX | | | Distance | Most suitable value | | |
|---|---|---|---|---|---|---|---|---|---|
| R | G | B | R | G | B | Q | R | G | B |
| 25 | 50 | 25 | 125 | 150 | 125 | 1 | 75 | 150 | 75 |
| 50 | 70 | 70 | 160 | 170 | 170 | 1 | 100 | 140 | 145 |
| 120 | 60 | 30 | 200 | 160 | 120 | 1 | 150 | 90 | 50 |
| 25 | 50 | 25 | 100 | 120 | 100 | 2 | 50 | 100 | 50 |
| 50 | 70 | 70 | 120 | 150 | 140 | 2 | 75 | 100 | 90 |
| --- | --- | --- | --- | --- | --- | --- | --- | --- | --- |

| Pixel number | Corrected image A | Corrected image B | Corrected image C |
|---|---|---|---|
| 1 | ○ | Shadow | Shadow |
| 2 | Shadow | Shadow | Shadow |
| 3 | Shadow | ○ | Shadow |
| 4 | Shadow | Shadow | ○ |
| 5 | ○ | ○ | ○ |
| 6 | ○ | ○ | Shadow |
| ⋮ | ⋮ | ⋮ | ⋮ |

IMAGING APPARATUS AND IMAGING METHOD

TECHNICAL FIELD

The present invention relates to an imaging apparatus and an imaging method which can make a color and shadow of an object captured with lighting by a flash unit as natural as a color and shadow of an object captured under natural light.

BACKGROUND ART

Recently, compact electronics cameras have become widely used, and capturing images have become easier than ever before. The handiness has encouraged more users to take electronics cameras with themselves and capture an image in a room and at night, as well as outside in the daytime. Since it is bright outside in the daytime, an image can be captured at a fast shutter speed even in automatic capturing. Besides, the brightness in the day time makes possible eliminating the need for unnecessarily high photographic sensitivity. This allows an image having little blurring and noise to be captured.

Due to short of brightness, meanwhile, capturing in a room and at night needs to employ a slow shutter speed to obtain a large amount of light, or to increase photographic sensitivity. The slow shutter speed, however, causes a problem in that the image blurs in the case where the object or the electronics camera moves while the shutter is opening. The high photographic sensitivity causes a problem in that a lot of noise is developed on the image even though the image is less blurred.

One of solutions to the problems is a capturing method to use a flash unit. When photographing an object at a short distance, using a flash unit makes possible enjoying brightness as good as that of outside in the daytime. Thus, the user can capture an image having little blurring and noise.

The most appropriate setting of an operating condition of the flash unit, however, cannot be determined until the user actually photographs the object to see the result. Since it is difficult to re-capture an image in the case where an opportunity for capturing an image is limited; for example the case of asking somebody to take a picture during a trip, and the case where an environment for capturing changes from moment to moment, the user desirably obtains a capturing result with no fault at the first try.

A technique described in Patent Reference 1 proposes, for example, a method for preventing a failure in photographing involving a use of a flash unit by changing a setting of a light intensity parameter of the flash or a setting of an ISO sensitivity to capture images in various kinds of brightness. This can prevent the user from failing to capture an image both at night and in the daytime.

Further, a technique described in Patent Reference 2 proposes, for example, a method for controlling an amount of light from the flash unit by de-actuating the flash when reflected flash arrives at a light receiving unit. Since this makes possible providing an appropriate amount of flash according to a distance to the object, the user can capture an image having little blurring and noise.

CITATION LIST

Patent Literature

[Patent Literature 1] Japanese Unexamined Patent Application Publication No. 2007-266926

[Patent Literature 2] Japanese Unexamined Patent Application Publication No. 2000-050152

SUMMARY OF INVENTION

Technical Problem

The techniques in Patent References 1 and 2 have a problem in that a color of an image obtained via capturing with flash to the object is different from a color sensed by a human under natural light without flash. This is because the flash to the object mixes the color of the object, which is the original color of the object, with the color of the flash.

A specific description shall be provided below with reference to FIGS. 24A and 24B. FIG. 24A shows color vectors sensed by a human when no flash is emitted. FIG. 24B shows color vectors sensed by a human when flash is emitted. It is noted as an example that the color vectors are represented as color vectors of the RGB color space.

An ambient color vector is set based on a color direction of ambient light and intensity of the ambient light. An object color vector is set based on a color direction of an object and color intensity (reflectance) of the object. A flash component vector is set based on a color direction of flash and intensity of the flash. A human intrinsically senses a color of an object as an object color with ambient light added. As shown in FIG. 24A, a human senses a color of an object in a form of an observation color vector produced with the object color vector and the ambient color vector summed.

Meanwhile, the flash adds a flash component to the observation color vector. Thus, as shown in FIG. 24B, a color to be captured is the sum of the object color vector, the ambient color, and the flash component vector. The comparison between FIGS. 24A and 24B clarifies the fact that the color obtained via capturing with the flash is different from a color which a human senses in a natural environment.

As described above, the flash solves a problem of blurring or photographic sensitivity; meanwhile, a new problem develops in that the color of the image is unnatural.

Thus, the present invention has as an object to provide an imaging apparatus and an imaging method to acquire enough brightness with flash, and to obtain an image having a color close to a color which a human senses, even in a dark environment.

Solution to Problem

In order to solve the problem, an aspect of an imaging apparatus according to the present invention is an imaging apparatus which emits a flash and photographs an object and includes: a lighting unit which emits the flash to the object; an image obtaining unit which obtains continuously-captured images including a first image and a second image by photographing the object while the lighting unit is emitting the flash, the second image having luminance greater than luminance of the first image; a color information obtaining unit which obtains, from the first image, color information of a first color vector; a luminance information obtaining unit which obtains, from the second image, luminance information of a second color vector; and an image generating unit which generates a corrected image by generating a third color vector corresponding to the color information of the first color vector and the luminance information of the second color vector, the corrected image having luminance greater than the luminance of the first image.

This makes possible obtaining (i) color information of the object from an image having low luminance; that is, an image having little effect of the flash, and further (ii) luminance information of the object from an image having great luminance; that is, an image having greatly influenced by the flash. Since the influence of the flash is little, the obtained color information is close to a color sensed by a human. Thus, by correcting the luminance with a use of the luminance information while maintaining the color information, the imaging apparatus can generate an image having enough brightness and presenting a color similar to a color sensed by a human.

Moreover, the color information obtaining unit may calculate, based on the first color vector, a unit color vector as the color information, the luminance information obtaining unit may calculate, based on the second color vector, color vector magnitude as the luminance information, and the image generating unit may generate a color vector as the third color vector, the color vector being obtained by multiplying the unit color vector by the color vector magnitude.

This involves executing a simple vector calculation. Thus, the imaging apparatus can generate an image having enough brightness and presenting a color similar to a color sensed by human.

Further, the color information obtaining unit may select an image having greatest luminance as the first image out of images having luminance equal to a predetermined first threshold value or smaller, the images being included in the continuously-captured images generated by the image obtaining unit.

This makes possible curbing the influence of the flash to minimum, and surely obtaining the color information. For example, this can prevent a case where a color vector having a needed length cannot be obtained since the image is too dark in simply obtaining color information according to an image having no flash emitted.

Moreover, the luminance information obtaining unit may select an image having a greatest luminance as the second image, the image being included in the continuously-captured images obtained by the image obtaining unit.

This makes possible obtaining luminance information indicating enough luminance.

In addition, the imaging apparatus may further include a shadow determining unit which determines whether or not a predetermined pixel represents shadow, wherein the image generating unit may generate the third color vector for a pixel not determined as the shadow by the shadow determining unit.

This can prevent a color vector having greater luminance from being generated in an area (i) which has been shadow before flash is emitted, and (ii) which newly becomes shadow by the imaging apparatus emitting the flash. Thus, the imaging apparatus can prevent the area which has been shadow before the emitting from being corrected and unshadowed, and generate an image presenting a color similar to a color sensed by a human. In addition, the imaging apparatus avoid correcting an area to newly be shadow, so that an obtained image is free from a sense of unnaturalness, compared with the object actually seen by a human.

Further, the shadow determining unit may (i) calculate a ratio of luminance of the predetermined pixel included in the first image to luminance of a pixel included in the second image, and (ii) determine, as the shadow, a pixel having the calculated luminance ratio being equal to a predetermined second threshold value or smaller, the luminance of the pixel included in the second image corresponding to the predetermined pixel.

This makes possible determining, as shadow, an area which is smaller than another pixel in rate of increase by the flash.

Further, the shadow determining unit may determine, as the shadow, the predetermined pixel equal to a predetermined third threshold or smaller, the predetermined pixel being included in the first image.

This allows the image selected by the color information obtaining unit to be used in determining the area which has been shadow before the imaging apparatus emitting the flash, which curbs a processing amount.

In addition, the imaging apparatus may include: a plurality of lighting units, including the lighting unit, each placed in a different position; and a control unit which sequentially causes the plurality of lighting units to emit flashes, the image obtaining unit may obtain continuously-captured images each corresponding to an associated one of the plurality of lighting units, the shadow determining unit may determine whether or not a predetermined pixel represents the shadow for each of the continuously-captured images, and the image generating unit may generate the corrected image for each of the continuously-captured images, and further (i) specify a pixel determined (a) as the shadow in a first corrected image included in the generated plurality of the corrected images, and (b) not as the shadow in a second corrected image included in the generated plurality of the corrected images, and (ii) generate a shadow-corrected image of which pixel, determined as the shadow, has been corrected, so that a pixel value of the specified pixel is a pixel value of a pixel included in the second corrected image, the first corrected image representing one of the generated plurality of the corrected images and the second corrected image representing another one of the generated plurality of the corrected images.

This makes possible emitting flashes to the object in different directions with a use of plural lighting unit each placed at a different position. The plural corrected images are generated with a use of the continuously-captured images each corresponding to an associated one of the flashes. Thus, each of the plural corrected images includes shadow in a different area. Hence, by replacing a pixel value of the pixel determined as shadow with a pixel value of the pixel determined not as shadow, the pixel determined as shadow can be corrected. Thus, the imaging apparatus can cancel the shadow caused by the flash with a use of another image to generate a natural image, eliminating effect of the shadow caused by the flash.

In addition, the image generating unit may (i) replace the pixel value of the specified pixel out of a plurality of pixels included in the first corrected image with the pixel value of the pixel included in the second corrected image, and (ii) generate the first corrected image as the shadow-corrected image, the first corrected image having the pixel value been replaced.

This involves replacing the pixel, determined as shadow, out of the pixels included in the first corrected image with the pixel, determined not as shadow, in another corrected image. Thus, the imaging apparatus can generate a natural image, eliminating effect of the shadow caused by the flash.

Further, the image generating unit may (i) sequentially select each of all the plurality of the corrected images except the first corrected image as the second corrected image, and (ii) specify the pixel determined as (a) the shadow in the first corrected image, and (b) not as the shadow in the selected second corrected image.

Since this executes comparison between pixels representing shadow and pixels not representing shadow on all the corrected images, a more natural image can be generated.

In addition, the imaging apparatus may further include a storing unit which stores a color conversion table in which a plurality of color vectors to be possibly included in the first image, a plurality of color vectors to be possibly included in the second image, and the plurality of the third color vectors correspond each other, wherein the image generating unit may generate, for each pixel, a third color vector corresponding to the first color vector and the second color vector by referring to the color conversion table.

This involves storing a table indicating a true value vector corresponding in advance to each color vector. Thus, the imaging apparatus can generate an image having enough brightness and a color close to a color which a human senses by simply referring to the table according to the obtained color vector without an extra calculation.

In addition, the imaging apparatus may further include a distance obtaining unit which obtains distance between the imaging apparatus and the object, wherein the image generating unit may further generate a corrected image having luminance greater than the luminance of the first image by correcting the third color vector with a use of the distance obtained by the distance obtaining unit.

Since obtaining distance for each object, this makes possible obtaining for each object the color information and the luminance information from the most suitable image. Thus, the imaging apparatus can generate an image having enough brightness and a color close to a color which a human senses.

In addition, the imaging apparatus may further include a storing unit which stores a color conversion table corresponding, each other, a plurality of sets of distance to the object, a plurality of color vectors to be possibly included in the first image, a plurality of color vectors to be possibly included in the second image, and the plurality of the third color vectors, wherein the image generating unit may generate the corrected image by referring to the color conversion table to generate, for each pixel, the third color vector corresponding to the plurality of the sets of the distance to the object, the first color vector, and the second color vector.

This involves storing a table indicating a true value vector corresponding in advance to each color vector. Thus, the imaging apparatus can generate an image having enough brightness and a color close to a color which a human senses by simply referring to the table according to the obtained color vector and the obtained distance without an extra calculation.

Moreover, the distance obtaining unit may obtain (i) first distance to the object in a pixel having a luminance value to be referenced, and (ii) second distance to the object in a target pixel, and the image generating unit may generate the corrected image having luminance greater than the luminance of the first image by multiplying the third color vector by a square of a ratio of the first distance to the second distance.

This allows the imaging apparatus to generate the most suitable image by executing a simple calculation, eliminating the need for storing a large table.

The lighting unit may emit flashes at least twice, the flashes each being different in amount of light, the image obtaining unit may obtain the first image and the second image by photographing the object for each emitting of the flash, and the second image may have a smaller amount than the first image in the flash.

In addition, the lighting unit may emit flashes at least twice, the flashes each being different in amount of light, the image obtaining unit may obtain the first image and the second image by photographing the object for each emitting of the flash, and the second image may have a smaller amount than the first image in the flash.

This allows the amount of the flash to be changed for each obtaining of an image. Accordingly, the imaging apparatus can surely obtain the continuously-captured images including the plural images each having different luminance.

Hence, even in the case where the imaging apparatus is slow in continuous capturing speed, the imaging apparatus can generate an image having enough brightness with effect of the flash curbed and a color close to a color which a human senses.

It is noted that the present invention can be realized as a method implementing processing units in the above imaging apparatus in forms of steps, and a program to cause a computer to execute the steps, as well as realized as the imaging apparatus. Further, the present invention may be realized in a form of: a storing medium including a computer-readable CD-ROM (Compact Disc-Read only Memory) storing the program; and information data and a signal showing the program. Such a program, information, data, and a signal may be distributed via a communications network including the Internet.

Advantageous Effects of Invention

The present invention makes possible obtaining an image having a bright and natural color with low noise and free from an unnatural shadow since the present invention can obtain an image having a color close to a color which a human senses, even in the case where a user uses a flash unit for capturing.

(Information Regarding a Technical Background in Accordance with the Present Invention)

The disclosure of Japanese Patent Application No. 2008-127386 filed on May 14, 2008 including specification, drawings and claims is incorporated herein by reference in its entirety.

BRIEF DESCRIPTION OF DRAWINGS

FIG. 2A shows color vectors of a target pixel having a small amount of a flash.

FIG. 2B shows color vectors of a target pixel having a large amount of a flash.

FIG. 2C shows color vectors of a target pixel of an image generated by an image generating unit.

FIG. 16 exemplifies a color conversion table in accordance with an embodiment 2.

FIG. 22 exemplifies a database showing a shadow determination result corresponding to each corrected image and each pixel.

DESCRIPTION OF EMBODIMENTS

Hereinafter, an imaging apparatus of the present invention shall be described in detail in accordance with embodiments with reference to the drawings.

Embodiment 1

An imaging apparatus in accordance with the embodiment 1 uses in combination a lighting unit, including a flash unit, and color information to be observed to make possible photographing an object having a natural color and a natural shadow even if an environment for capturing is dark.

Figure 1:
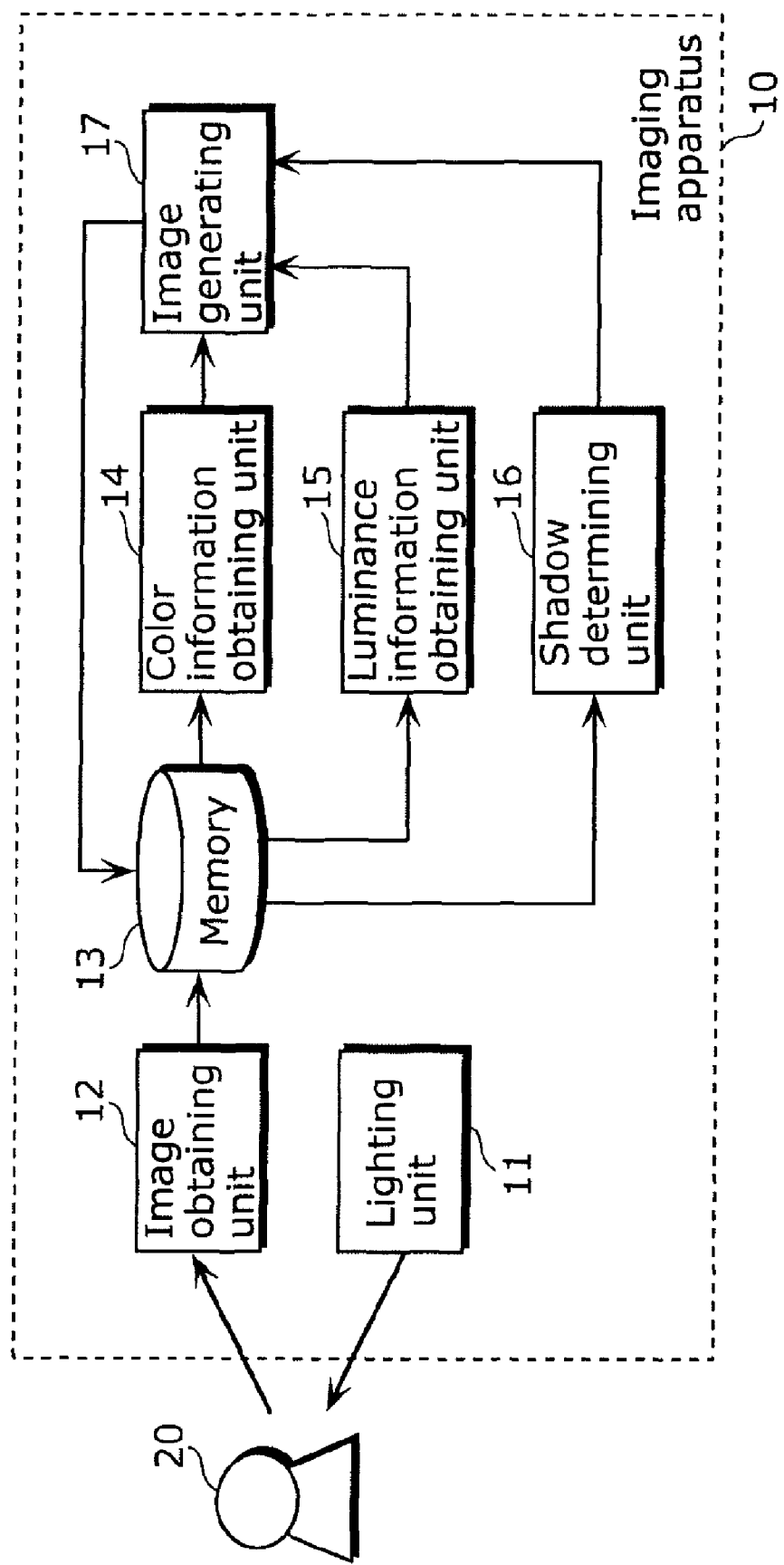
FIG. 1 is a block diagram exemplifying a structure of an imaging apparatus in accordance with an embodiment 1.

FIG. 1 is a block diagram exemplifying a structure of an imaging apparatus 10 in accordance with an embodiment 1. As shown in FIG. 1, the imaging apparatus 10 includes a lighting unit 11, an image obtaining unit 12, a memory 13, a color information obtaining unit 14, a luminance information obtaining unit 15, a shadow determining unit 16, and an image generating unit 17.

The lighting unit 11 emits a flash to an object 20.

The image obtaining unit 12 obtains continuously-captured images including at least two images each having different luminance by photographing the object 20 while the lighting unit 11 is emitting the flash. Specifically, the image obtaining unit 12 obtains the continuously-captured images when the imaging device 10 continuously photographs the object 20 at a high speed from the time at which the lighting unit 11 starts emitting the flash on the object 20 to the time at which the lighting unit 11 ends emitting the flash on the object 20. For example, the image obtaining unit 12 includes: a lens which condenses light from the object 20; and an image sensor, such as a Charge Coupled Device (CCD), and a Complementary Metal Oxide Semiconductor (CMOS).

The memory 13 stores the continuously-captured images obtained by the image obtaining unit 12. Here, each of plural images included in the continuously-captured images has a number for identifying an associated one of the plural images (referred to as a continuous capturing number).

The color information obtaining unit 14 selects one image out of the continuously-captured images stored in the memory 13 to obtain color information out of a color vector of a target pixel for each pixel of the selected image. Specifically, the color information obtaining unit 14 selects, for each pixel, an image having: little effect of flash from the lighting unit 11; and a certain amount of light, and obtains color information of the object 20 for each pixel. It is noted in the embodiment 1 that the color information is obtained on a pixel basis, with three pixels including an R-pixel, a G-pixel, and a B-pixel representing one pixel. Further, the color information represents each pixel value of the R-pixel, the G-pixel, and the B-pixel. In addition, the color information may represent a unit color vector calculated based on each pixel value.

The luminance information obtaining unit 15 (i) selects, out of the continuously-captured images stored in the memory 13, an image having luminance greater than that of the image selected by the color information obtaining unit 14, and (ii) obtains luminance information out of the color vector of the target pixel for each pixel of the selected image. Specifically, the luminance information obtaining unit 15 selects on a pixel basis an image which is greatly affected by the flash from the lighting unit 11, and obtains the luminance information of the object 20 on a pixel basis. It is noted that the luminance information represents an intensity value of three-dimensional vector of the R-pixel, the G-pixel, and the B-pixel.

Here, each piece of information is obtained based on the RGB color space; meanwhile, the information may be obtained based on another color space instead of the RGB color space, such as the YCrCb color space.

The shadow determining unit 16 determines whether or not the target pixel is shadow. Specifically, the shadow determining unit 16 determines whether or not the target pixel has been shadow before the flash is emitted. In addition, the shadow determining unit 16 determines whether or not the target pixel is new shadow with the flash emitted.

It is noted that the detailed operations of the color information obtaining unit 14, the luminance information obtaining unit 15, and the shadow determining unit 16 shall be described hereinafter, with reference to the drawings.

The image generating unit 17 generates a color vector corresponding to the color information and the luminance information of the target pixel on a pixel basis so as to generate a corrected image having luminance greater than that of the image selected by the color information obtaining unit 14. The above image generating processing is executed only on a pixel which is not determined as shadow by the shadow determining unit 16.

Described next are the image generating processing executed by the image generating unit 17 in accordance with the embodiment 1 and an effect thereof, with reference to FIGS. 2A to 2C.

FIG. 2A shows color vectors of a target pixel when an amount of the flash is small. FIG. 2B shows color vectors of a target pixel when an amount of the flash is large. FIG. 2C shows color vectors of a target pixel of the image generated by the image generating unit 17.

An observation color vector indicates a color component actually observed to the human eye. Since affected by the flash emitted from the lighting unit 11, the observation color vector is a sum of a color component vector indicating an original color component and a flash component vector generated by the flash. As shown in FIG. 2A, the small amount of the flash makes the flash component vector small. Thus, the observation color vector does not see much difference from the color component vector in direction. However, the length of the observation color vector (luminance value) in FIG. 2A is short. Thus, the user cannot fully sense color information visually because the length of the observation vector is short when the user sees the obtained image.

Meanwhile, the large amount of the flash as shown in FIG. 2B makes the length of the observation color vector (luminance value) long since the flash component vector is long. This allows the user to fully sense the color information visually when the user sees the obtained image. The long-length flash component vector, however, usually makes the observation color vector different from the color component vector in direction. This looks the obtained image different from the image of the object actually seen by the user in color.

Thus, as seen in FIG. 2C, extending the vector in the direction of the observation color vector shown in FIG. 2A makes possible obtaining an image having approximately the same coloring as the object actually observed by the user and enough brightness.

Specific operations for extending the vector shall be described below.

In the embodiment 1, the color information obtaining unit 14 obtains a unit color vector by normalizing the observation color vector found when the amount of the flash is small as shown in FIG. 2A. Further, the luminance information obtaining unit 15 obtains the length of the observation color vector found when the amount of the flash is large as shown in FIG. 2B.

In the case of the RGB color space, for example, the image generating unit 17 obtains the unit color vector with a use of Equations 1 to 3, where the values of the observation color vector obtained by the color information obtaining unit 14 are (R, G, B) and the values of the unit color vector are (R1, R2, R3).

[Math 1]

$$R1 = \frac{1}{\sqrt{R^2 + G^2 + B^2}} R \quad \text{(Equation 1)}$$

$$G1 = \frac{1}{\sqrt{R^2 + G^2 + B^2}} G \quad \text{(Equation 2)}$$

$$B1 = \frac{1}{\sqrt{R^2 + G^2 + B^2}} B \quad \text{(Equation 3)}$$

As shown in Equation 4, the image generating unit 17 renews the color information by multiplying the length of the observation color vector and that of the unit color vector obtained by the luminance information obtaining unit 15. In other words, the image generating unit 17 generates the observation color vector shown in FIG. 2C. It is noted that values of the observation color vector obtained by the luminance information obtaining unit 15 are assumed as (R2, G2, B2), and values of the observation color vector of the generated image as (R3, G3, B3).

[Math 2]

$$\begin{bmatrix} R3 \\ G3 \\ B3 \end{bmatrix} = \sqrt{R2^2 + G2^2 + B2^2} \begin{bmatrix} R1 \\ G1 \\ B1 \end{bmatrix} \quad \text{(Equation 4)}$$

As described above, the image generating unit 17 corrects vector magnitude of the color information on a pixel basis, making possible generating an image having enough brightness and approximately the same coloring as the object actually observed by the user.

Figure 3:
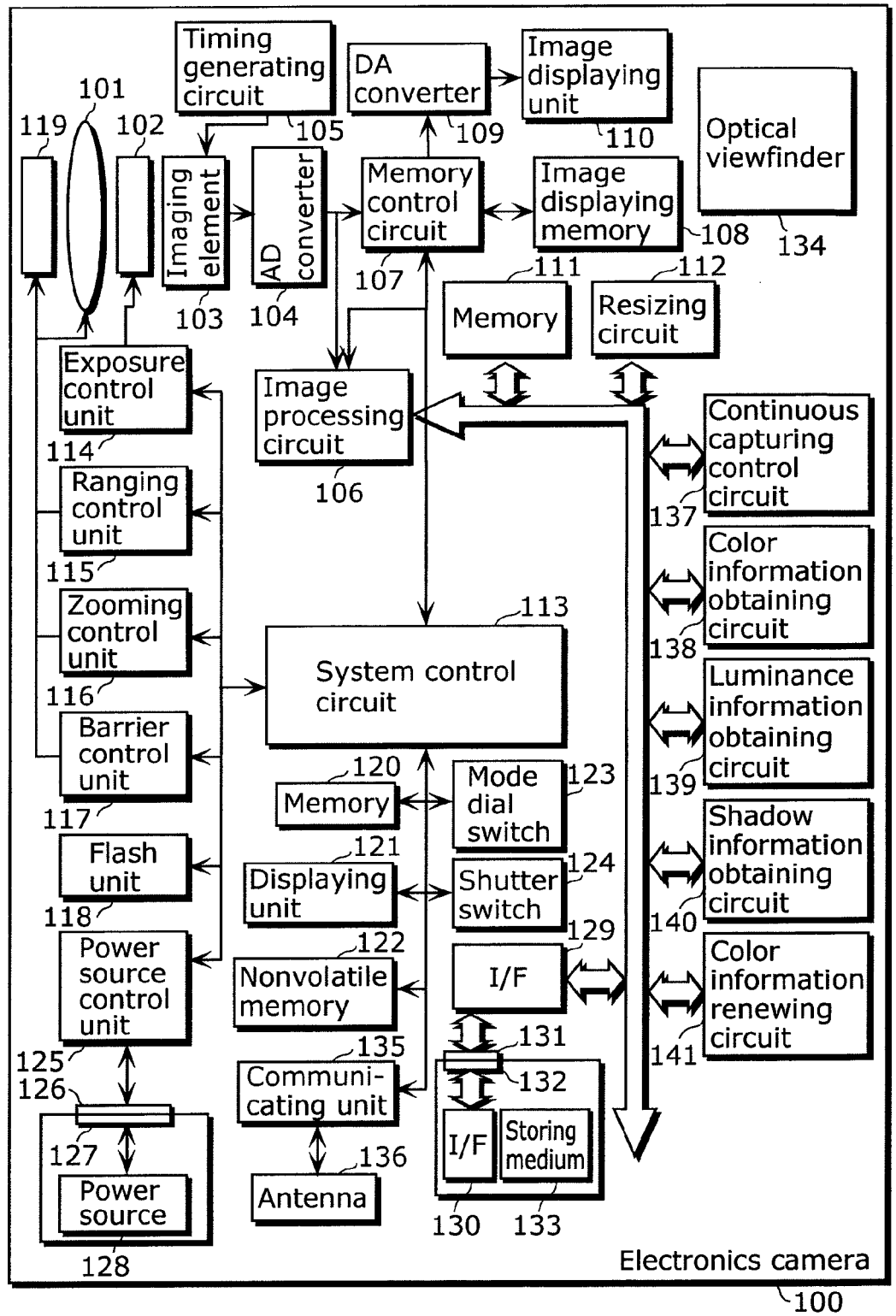
FIG. 3 is a block diagram exemplifying a structure of an electronics camera which is a specific example of the imaging apparatus in accordance with the embodiment 1.

FIG. 3 is a block diagram exemplifying a structure of an electronics camera 100 which is a specific example of the imaging apparatus 10 in accordance with the embodiment 1. The electronics camera 100 in FIG. 3 includes, an imaging lens 101, a shutter 102, an imaging device 103, an AD converter 104, a timing generating circuit 105, an image processing circuit 106, a memory control circuit 107, an image displaying memory 108, a DA converter 109, an image displaying unit 110, a memory 111, a resizing circuit 112, a system control circuit 113, an exposure control unit 114, a ranging control unit 115, a zooming control unit 116, a barrier control unit 117, a flash unit 118, a protecting unit 119, a memory 120, a displaying unit 121, a nonvolatile memory 122, a mode dial switch 123, a shutter switch 124, a power source control unit 125, connectors 126 and 127, a power source 128, interfaces 129 and 130, connectors 131 and 132, a storing medium 133, an optical viewfinder 134, a communicating unit 135, an antenna 136, a continuous capturing control circuit 137, a color information obtaining circuit 138, a luminance information obtaining circuit 139, a shadow information obtaining circuit 140, and a color information renewing circuit 141. The power source 128 and the storing media 133 may be removable.

The imaging lens 101, capable of zooming and focusing, focuses incident light on the imaging device 103.

The shutter 102, capable of aperturing, adjusts an amount of the incident light coming into the imaging device 103.

The imaging device 103 converts into an electric signal (image data) an optical image obtained through the focusing of the incident light.

The AD converter 104 converts an analogue signal provided from the imaging device 103 into a digital signal. The AD converter 104 writes an image data, converted into the digital signal, into the image displaying memory 108 or the memory 111 via the memory control circuit 107. Alternatively, the AD converter 104 provides the image data, converted into the digital signal, to the image processing circuit 106.

The timing generating circuit 105 supplies a clock signal or a control signal to the imaging device 103, the AD converter 104, and the DA converter 109. The timing generating circuit 105 is controlled by the memory control circuit 107 and the system control circuit 113.

The image processing circuit 106 executes predetermined image interpolation and color conversion onto the image data provided from the AD converter 104 or the image data provided from the memory control circuit 107. The image processing circuit 106 uses the image data to be provided to execute a predetermined operation. Based on the operation result, the system control circuit 113 controls the exposure control unit 114 and the ranging control unit 115.

The memory control circuit 107 controls the AD converter 104, the timing generating circuit 105, the image processing circuit 106, the image displaying memory 108, the DA converter 109, the memory 111, and the resizing circuit 112.

The image displaying memory 108 stores digitally-signaled image data for display.

The DA converter 109 obtains the digitally-signaled image data for display from the image displaying memory 108 via the memory control circuit 107, and converts the digitally-signaled image data into an analog-signaled image data for display.

The image displaying unit 110 displays the analog-signaled image data for display converted by the DA converter 109. The image displaying unit 110 is, for example, a Thin Film Transistor Liquid Crystal Display (TFTLCD).

The memory 111 stores the image data obtained from the AD converter 104 and the image data processed by the image processing circuit 106. The memory 111 corresponds to the memory 13 in FIG. 1.

The resizing circuit 112 generates a low-resolution image out of the captured image. It is noted that the resizing circuit 112 can select among predetermined resolutions as usage. The resizing circuit 112 reads the image data stored in the memory 111, executes resizing on the read image data, and writes the resized data into the memory 111.

The resizing circuit 112 is used when the user desires to store image data, in the storing medium 133, with the number of pixels (size) different from that of the imaging device 103. Since the number of pixels displayable on the image displaying unit 110 is significantly smaller than that of the imaging device 103, the resizing circuit 112 is also used in generating an image for display when the image displaying unit 110 displays captured image data thereon.

The system control circuit 113 controls each of the processing units and processing circuits in the entire electronics camera 100 to execute capturing. The capturing includes exposure, development, and storing. The exposure is to write the image data read from the imaging device 103 into the memory 111 via the AD converter 104 and the memory control circuit 107. The development is to execute an operation on the image processing circuit 106 and the memory control circuit 107. The storing is to read the image data from the memory 111, and write the read image data into the storing medium 133.

The exposure control unit 114 controls the shutter 102 which is capable of aperturing. The exposure control unit 114 is also capable of adjusting the flash by working together with the flash unit 118.

The ranging control unit 115 and the zooming control unit 116 respectively control the focusing and the zooming of the imaging lens 101. The barrier control unit 117 controls an operation of the protecting unit 119.

The flash unit 118 emits the flash to the object. Further, the flash unit 118 is capable of operating an auto focus (AF) illuminator and adjusting the flash. The flash unit 118 corresponds to the lighting unit 11 in FIG. 1.

The protecting unit 119 is a barrier for covering the imaging unit of the electronics camera 100, the imaging unit which includes the imaging lens 101, the shutter 102, and the imaging device 103. The covering given by the protecting unit 119 prevents the imaging unit from getting dirty or being broken.

The memory 120 stores a constant number, a variable number, and a program for the operation of the system control circuit 113.

The displaying unit 121 is a liquid crystal display or a speaker which provides an operation status and a message, based on the execution of the program on the system control circuit 113, with a use of a letter, an image, or an audio. The displaying unit 121 is structured with the combination of a Liquid Crystal Display (LCD), a Light Emitting Diode (LED), and a sound generating element.

The nonvolatile memory 122, capable of electrical erasing and storing, stores operation configuration data of the electronics camera 100 and information unique to the user. The nonvolatile memory 122 is, for example, the Electrically Erasable and Programmable Read Only Memory (EEPROM).

The mode dial switch 123 switches among each of function modes including an automatic capturing mode, a capturing mode, a panoramic capturing mode, and a RAW mode, and sets one of the function modes.

The shutter switch 124 (i) is turned on while the user is pressing a shutter button (not shown), (ii) and gives an instruction to start an operation including the Automatic Exposure (AE) processing and the Auto White Balance (AWB) processing. The shutter switch 124 also gives an instruction to start a flow of operations, such as exposure, development, and storing.

The power source control unit 125 includes a battery detecting circuit, a DC-DC converter, and a switching circuit for switching current-carrying blocks. The power source control unit 125 detects presence or absence of a battery, a kind of the battery, and a remaining battery level. The power source control unit 125 further controls the DC-DC converter based on a result of the detection and an instruction from the system control circuit 113, feedbacks a necessary voltage, and supplies the voltage to each of processing units including the storing medium 133 via the connectors 126 and 127.

The connectors 126 and 127 connect the power source control unit 125 and the power source 128.

The power source 128 includes a primary battery, such as an alkaline battery and a lithium cell, a secondary battery, such as a nickel cadmium (NiCd) cell, a nickel metal hydride (NIMH) battery, and a lithium (Li) battery, and an AC adapter.

The interfaces 129 and 130 are used for transmission and reception of the image data between the storing medium 133 and the memory 111.

The connectors 131 and 132 are provided in order for the storing medium 133 to make a connection via the interfaces 129 and 130.

The storing medium 133 is a memory card or a hard disk for storing the image data.

The optical viewfinder 134 is used for the user checking the object. The user can capture an image only with a use of the optical viewfinder, dispensing with an electronics viewfinder function included in the image displaying unit 110.

The communicating unit 135 includes various communications functions, such as the RS232C, the universal serial bus (USB), the IEEE 1394, a modem, a local area network (LAN), and wireless communication.

The antenna 136 is used as a connector connecting the electronics camera 100 with another device via the communicating unit 135. The antenna 136 is also used for an antenna to establish wireless communication.

The continuous capturing control circuit 137 continuously obtains image signals provided from the imaging device 103, and stores into the memory 111 the images with associated continuous capturing numbers assigned.

The color information obtaining circuit 138 (i) selects, for each pixel, an image having little effect of the flash and a certain amount of light out of the continuously-captured images stored in the memory 111 by the continuous capturing control circuit 137, (ii) obtains the color information of the object for each pixel, and (iii) writes the color information into the memory 111. The color information obtaining circuit 138 corresponds to the color information obtaining unit 14 in FIG. 1.

The luminance information obtaining circuit 139 (i) selects an image which is greatly affected by the flash out of the continuously-captured images stored in the memory 111 by the continuous capturing control circuit 137, (ii) obtains the luminance information of the object, and (iii) writes the luminance information of the object into the memory 111. The luminance information obtaining circuit 139 corresponds to the luminance information obtaining unit 15 in FIG. 1.

The shadow information obtaining circuit 140 determines an area to be shadow out of the continuously-captured images stored in the memory 111 by the continuous capturing control circuit 137, and writes shadow position information into the memory 111. It is noted that the determination of the shadow is described hereinafter. The shadow information obtaining circuit 140 corresponds to the shadow determining unit 16 in FIG. 1.

The color information renewing circuit 141 generates color information, renewed for each pixel, out of the color information, the luminance information, and the shadow position information stored in the memory 111, and writes the generated renewed color information into the memory 111. In an un-shadowed area, the renewed color information has the brightness equivalent to that provided by the flash. The brightness of the renewed color information is obtained by extending the magnitude of a color vector, which is close to an originally-sensed color, to a value obtained from the luminance information. Here, the originally-sensed color is obtained from the color information. In a shadow area, the maximum luminance is observed when the flash unit is not used. A value with little effect of the flash is used in the shadowed area in order to keep shadow generated by the flash from affecting the renewed color information. The color information renewing circuit 141 corresponds to the image generating unit 17 in FIG. 1.

In the case where one of the continuous capturing control circuit 137, the color information obtaining circuit 138, the luminance information obtaining circuit 139, the shadow information obtaining circuit 140, and the color information renewing circuit 141 is omitted, the system control circuit 113 may execute tracking and renewing, using software.

Here, the image obtaining unit 12 in FIG. 1 mainly corresponds to the imaging lens 101, the shutter 102, the imaging device 103, the AD converter 104, and the image processing circuit 106.

Described next is an operation of the imaging apparatus 10 in accordance with the embodiment 1.

Figure 4:
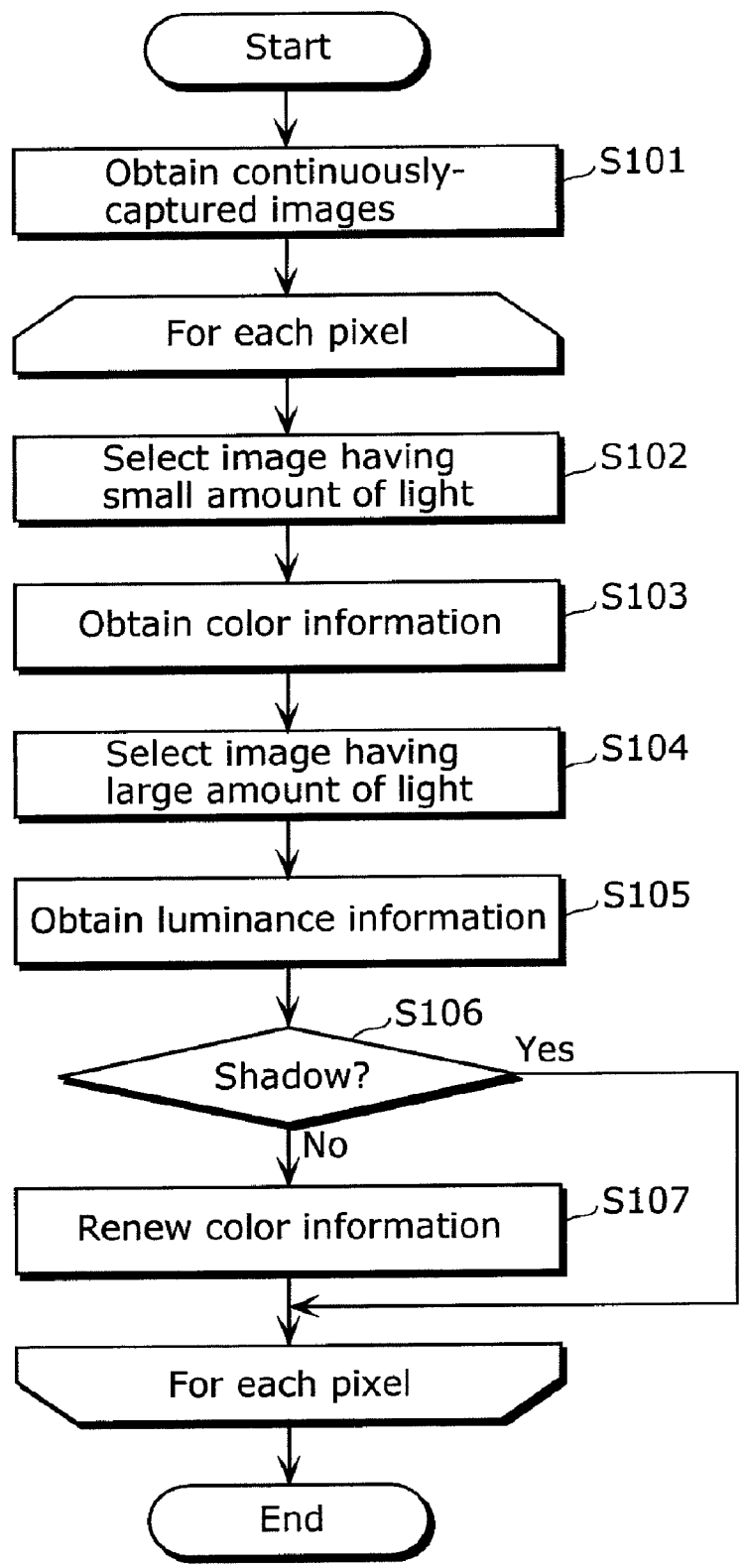
FIG. 4 is a flowchart exemplifying an operation of the imaging apparatus in accordance with the embodiment 1.

FIG. 4 is a flowchart exemplifying the operation of the imaging apparatus 10 in accordance with the embodiment 1.

First, the image obtaining unit 12 obtains the continuously-captured images (S101). Specifically, the image obtaining unit 12 obtains the continuously-captured images including plural images when the imaging apparatus 10 continuously photographs the object 20 at a high speed from the time at which the lighting unit 11 starts emitting the flash on the object 20 to the time at which the lighting unit 11 ends emitting the flash on the object 20. The obtained continuously-captured images are stored in the memory 13. In the electronics camera 100, the system control circuit 113 controls each of the processing units and processing circuits to execute the capturing.

Then, sets of processing are executed, for each pixel, to the obtained continuously-captured images. Here, the set of processing are from the color information obtainment (S102) to the color information renewal (S107) as shown below. It is noted that a control unit (not shown) in the imaging apparatus 10 gives controls over which pixel receives the sets of processing. In the electronics camera 100, for example, the system control circuit 113 executes the control.

The color information obtaining unit 14 selects the image having little effect of the flash out of the continuously-captured images (S102). The details of the selecting shall be described hereinafter with a use of the drawings. Then, the color information obtaining unit 14 obtains as the color information the unit color vector out of the selected image (S103).

Next, the luminance information obtaining unit 15 selects out of the continuously-captured images the image which is greatly affected by the flash (S104). The details of the selecting shall be described hereinafter with the use of the drawings. Then, the luminance information obtaining unit 15 obtains out of the selected image color vector magnitude as the luminance information (S105).

It is noted that whichever may be executed in first, the color information obtainment or the luminance information obtainment.

Then, the shadow determining unit 16 determines whether or not the target pixel is shadow (S106). When the target pixel is determined to be shadow (S106: Yes), the color information on the target pixel is not renewed. Then, the next pixel is designated as a target pixel, and the sets of processing are repeatedly executed from the color information obtainment (S102).

When the target pixel is determined not to be shadow (S106: No), the color information on the target pixel is renewed according to the color information and the luminance information (S107). When the color information renewal ends, the next pixel is designated as the target pixel, and the sets of processing are repeatedly executed from the color information obtainment (S102).

It is noted in the electronics camera 100 that the image generated by renewing the color information for each pixel as described above is stored in the memory 111. Then, the resizing circuit 112 executes resizing on the stored image to generate the image for display. The image displaying unit 110 displays the generated image for display. This makes possible obtaining an image having the same color as a color which the user actually senses the object.

Described below is the color information obtainment (FIG. 4: S103) with reference to FIGS. 5A and 5B.

Figure 5A:
FIG. 5A exemplifies continuously-captured images including plural images each having a different amount of the flash.
Figure 5B:
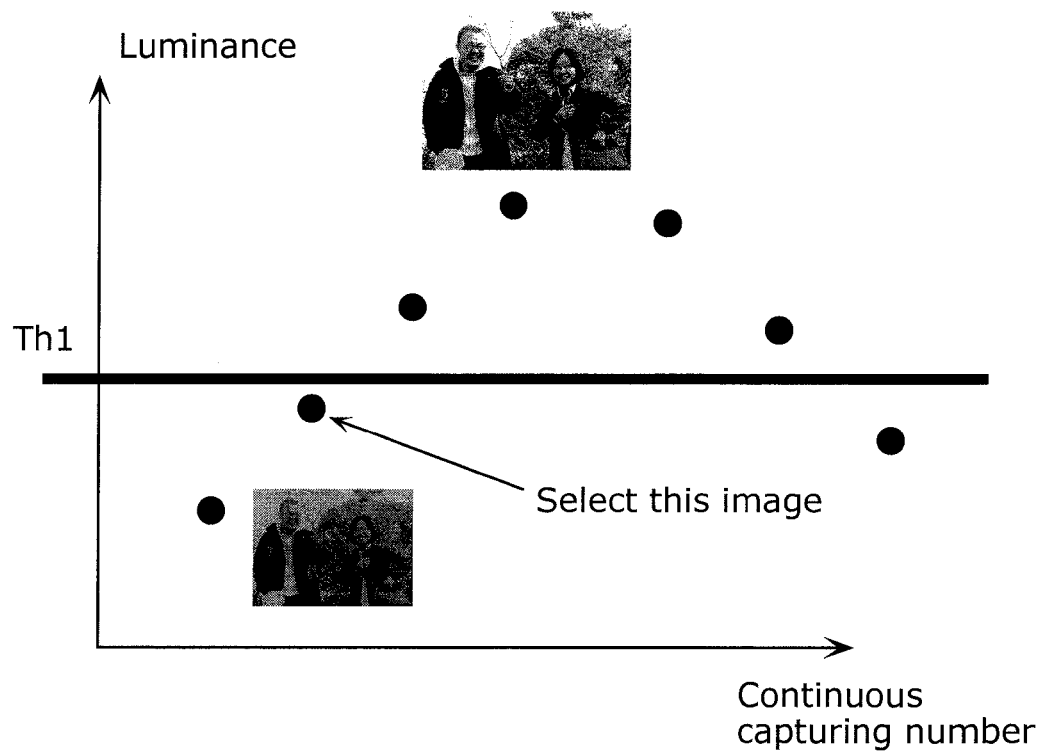
FIG. 5B shows a luminance change in one of pixels in the continuously-captured images.

FIG. 5A exemplifies continuously-captured images including plural images each having a different amount of the flash. FIG. 5B shows a luminance change in one of pixels in the continuously-captured images.

Between the time at which the lighting unit 11 starts emitting the flash on the object 20 and the time at which the lighting unit 11 ends emitting the flash on the object 20, the imaging apparatus 10 continuously captures images. Then, the continuously-captured images shown in FIG. 5A are stored in the memory 13. Here, a luminance change is observed in one of the pixels in the continuously-captured images, as shown in FIG. 5B. The horizontal axis in FIG. 5B indicates the continuous capturing numbers. The vertical axis indicates the luminance. The FIG. 5B shows that the color information obtaining unit 14 selects an image having the greatest luminance out of images having luminance smaller than a threshold variable number "Th1", and obtains the color information out of the pixel of the selected image.

It is noted that the threshold variable number "Th1", varying for each pixel, can be determined for each pixel that "Th1" is n-times as great as the luminance observed before the flash has been emitted, for example. The threshold variable number may be determined for each object, or each capturing mode. A larger threshold variable number "Th1", susceptible to the flash, makes possible obtaining the color information even in the very dark. Meanwhile, a smaller threshold variable number "Th1", insusceptible to the flash, has difficulty in obtaining the color information in the very dark environment. Thus, the luminance of the entire image may be taken into consideration to determine "Th1".

Described next is the luminance information obtainment (FIG. 4: S105) with reference to FIG. 6.

Figure 6:
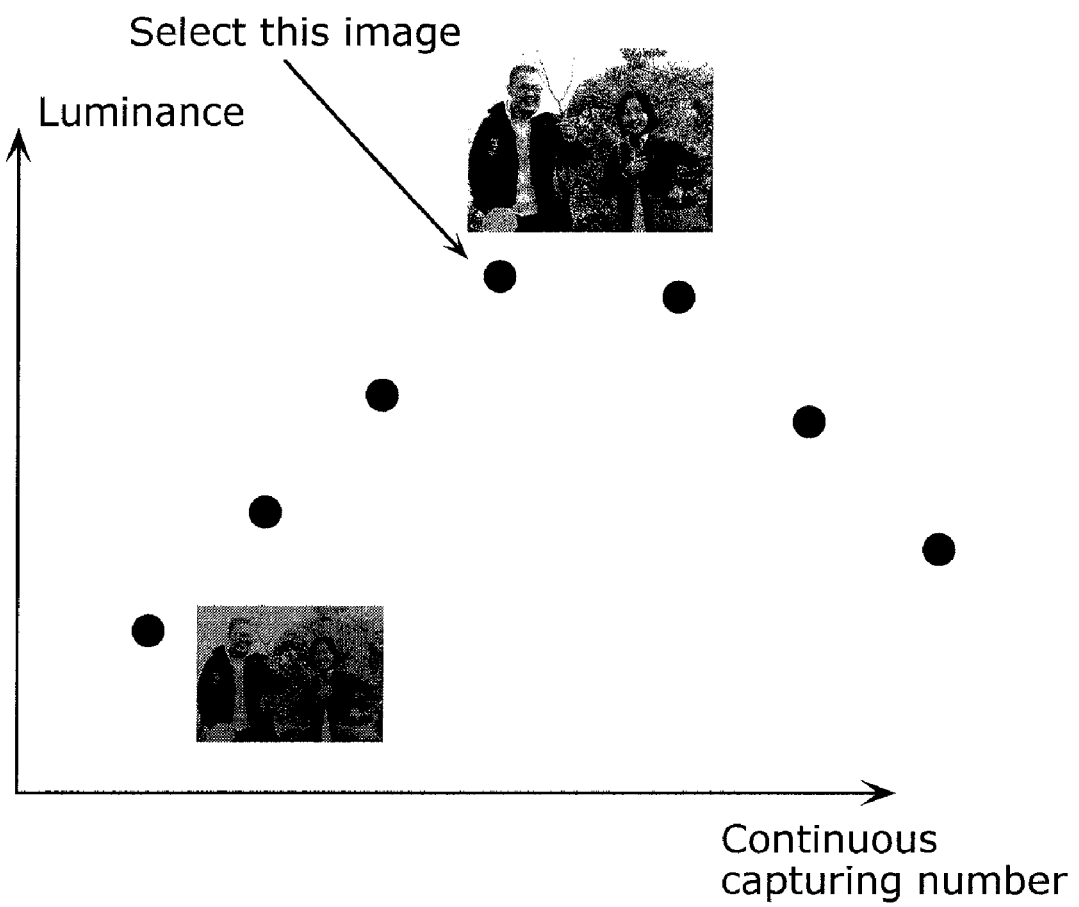
FIG. 6 shows a luminance change in one of pixels in the continuously-captured images.

FIG. 6 shows a luminance change in one of the pixels in the continuously-captured images. The vertical axis and the horizontal axis respectively indicate the luminance and the continuous capturing numbers. As shown in FIG. 6, the luminance information obtaining unit 15 selects an image having the greatest luminance for each pixel in the continuously-captured images, and obtains the luminance information out of the pixel of the selected image. This makes possible selecting an image, for each pixel, having the greatest flash, and obtaining a great luminance value. It is noted that when the luminance value is saturated, an unsaturated value is employed instead of the greatest value, so that a natural image can be created.

Next described is the shadow determination (FIG. 4: S106) with reference to FIGS. 7 and 8. There are two cases when the target pixel is determined to be shadow as described above; that is, the case where the target pixel has already represented shadow in an image generated before the flash is emitted, and the case where the target pixel is newly determined to be shadow by the imaging apparatus 10 emitting the flash. In whichever case, the color information renewal is not executed on a pixel determined to be shadow.

When the color information is renewed in a pixel which has represented shadow before the flash is emitted, there is a case where the luminance value of the shadow becomes great, and thus a shadow area decreases in the generated image. In other word, this possibly makes a big difference between the generated image and the original image, and creates a sense of unnaturalness to the generated image. The imaging apparatus 10 in accordance with the embodiment 1 executes no color information renewal on the pixel having represented shadow before the flash is emitted. Thus, the shadow determining unit 16 determines whether or not the target pixel has represented shadow before the flash is emitted.

Figure 7:
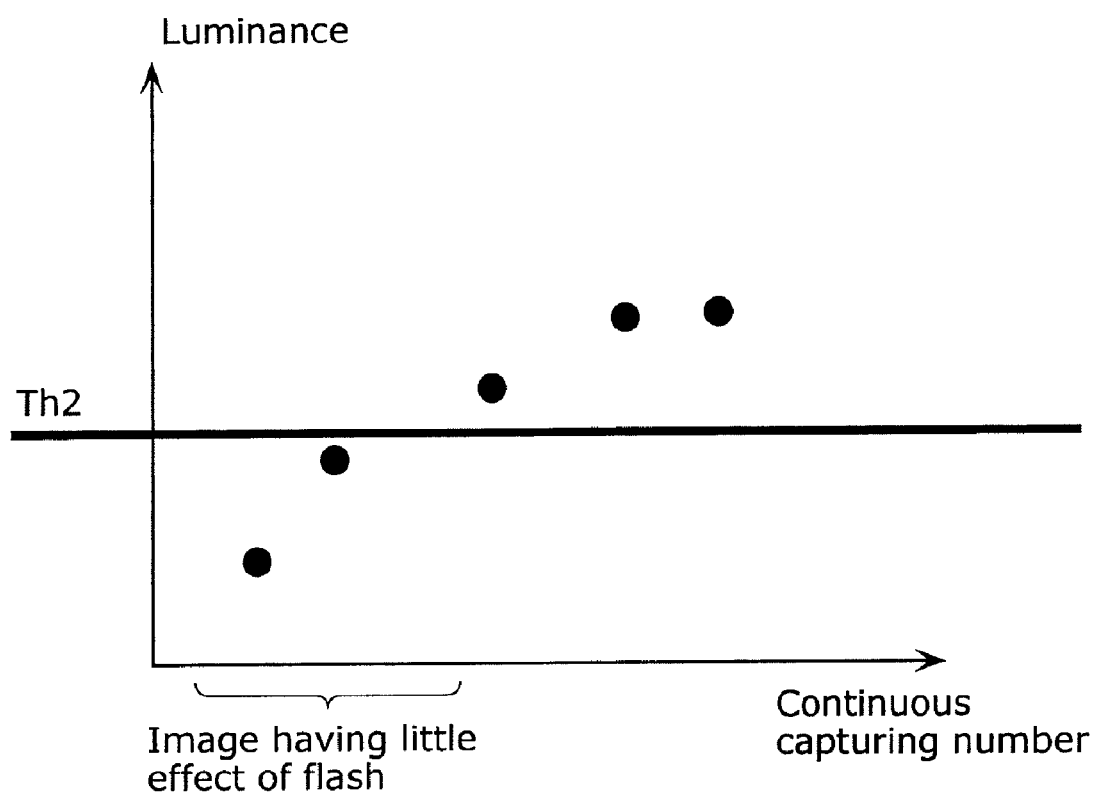
FIG. 7 shows relationship among luminance values of pixels which have already represented shadow in an image generated before the flash is emitted.

FIG. 7 shows relationship among luminance values of pixels which have already represented shadow in an image generated before the flash is emitted. The vertical axis and the horizontal axis respectively indicate the luminance and the continuous capturing numbers. The pixel having represented shadow before the flash is emitted has a luminance value smaller than that of a regular pixel. Hence, the shadow determining unit 16 compares a luminance value of an image with a predetermined threshold value "Th2", the image which has a continuous capturing number indicating little influence of the flash. The shadow determining unit 16 determines a pixel having a luminance value smaller than the threshold value "Th2" as a pixel having represented shadow. For example, the shadow determining unit 16 determines the target pixel as shadow in the case where the luminance value of the target pixel of the image selected by the color information obtaining unit 14 is smaller than the threshold value "Th2".

It is noted that the threshold value "Th2" is determined by the amount of the flash; that is, by a standard of the flash unit 118 used for the lighting unit 11. The threshold value "Th2" may be changed by the user.

The shadow determining unit 16 may utilize another image than the image selected by the color information obtaining unit 14. For example, the shadow determining unit 16 may compare "Th2" with the luminance value of the target pixel of the image generated before the flash is emitted.

The imaging apparatus in accordance with the embodiment 1 executes no color information renewal on the pixel newly representing shadow by the imaging apparatus emitting the flash, as well. This is also because the execution of the color information renewal possibly makes a big difference between the generated image and the original image, and creates a sense of unnaturalness to the generated image. Thus, the shadow determining unit 16 further determines whether or not the target pixel is the pixel newly representing shadow by the imaging apparatus emitting the flash.

Figure 8:
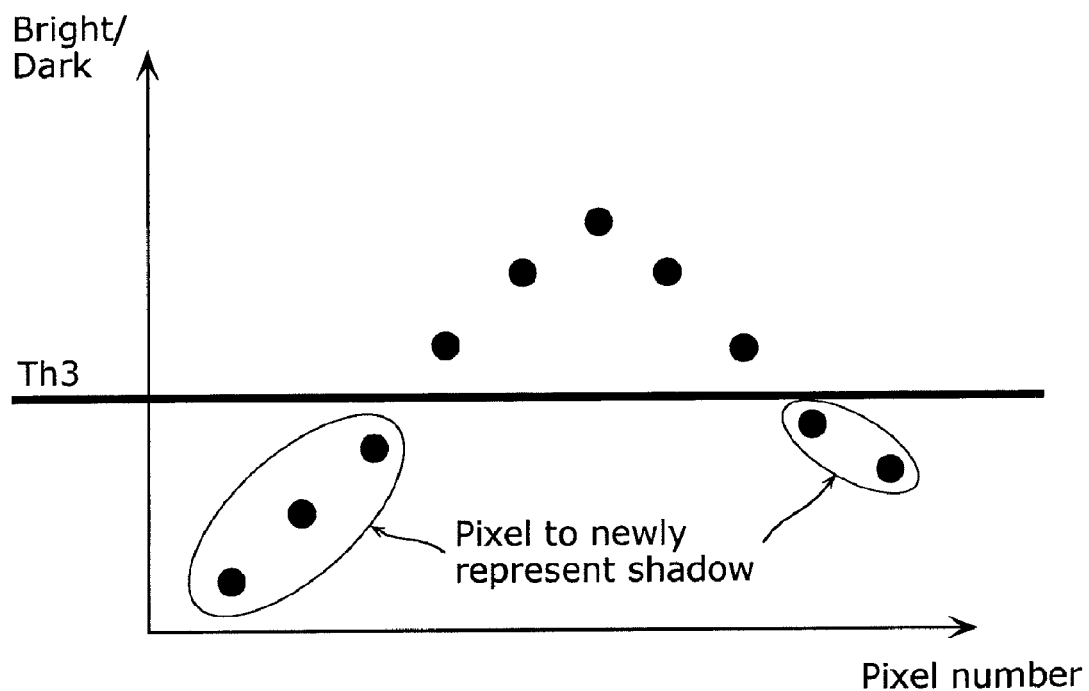
FIG. 8 shows a ratio of a luminance value, for each of pixel, of a selected image having a small amount of light to a selected image having a large amount of light.

FIG. 8 shows a luminance value ratio, for each pixel, of a selected image having a small amount of light to a selected image having a large amount of light. The vertical axis shows a luminance value ratio of an image having a small amount of amount of light to an image having a large amount of light. The horizontal axis shows a number assigned to each pixel (referred to as a pixel number, hereinafter).

Usually, the flash makes the image having a large amount of light greater than the image having a small amount of light in luminance value. The shadow pixel, however, observes a smaller gain than a regular pixel in luminance value. Thus, as shown in FIG. 8, the shadow determining unit 16 can determine an area to be newly designated as shadow in the image due to the flash by determining, for each pixel, the pixel having the luminance value ratio smaller than a predetermined threshold "Th3" as the shadow. Here, the luminance value ratio is a ratio of the image with a small amount of light to the image with a large amount of light.

The image having a small amount of light and the image having a large amount of light may respectively be selected by the color information obtaining unit 14 and the luminance information obtaining unit 15. In addition, the shadow determining unit 16 may select images having the smallest luminance value and the greatest luminance value as the images having a small amount of light and a large amount of light, respectively.

As described above, the imaging apparatus in accordance with the embodiment 1 can (i) capture continuously-captured images including two or more images while the flash is being emitted, (ii) correct, according to the color information and the luminance information of the obtained continuously-captured images, the brightness of an image captured at night to the same brightness of the color of an image captured under natural light, and (iii) achieve image quality of the image captured in the dark as excellent as that captured under natural light. Since the image looks approximately the same as an image captured under the natural light in color and brightness, the coloring of the image captured therewith can be free from unnaturalness which causes an image to look different from the original color of the object due to the flash. Further, the imaging apparatus in accordance with the embodiment 1 can reduce an effect of shadow; that is, an adverse effect caused by the flash.

Embodiment 2

An imaging apparatus in accordance with an embodiment 2 estimates distance to each of objects in the case where several objects are found, and utilizes distance information obtained via the estimation. Thus, the imaging apparatus can execute synthesizing for each object with a use of an image having the most appropriate time, for receiving the flash, which cannot be obtained with no distance information.

Figure 9:
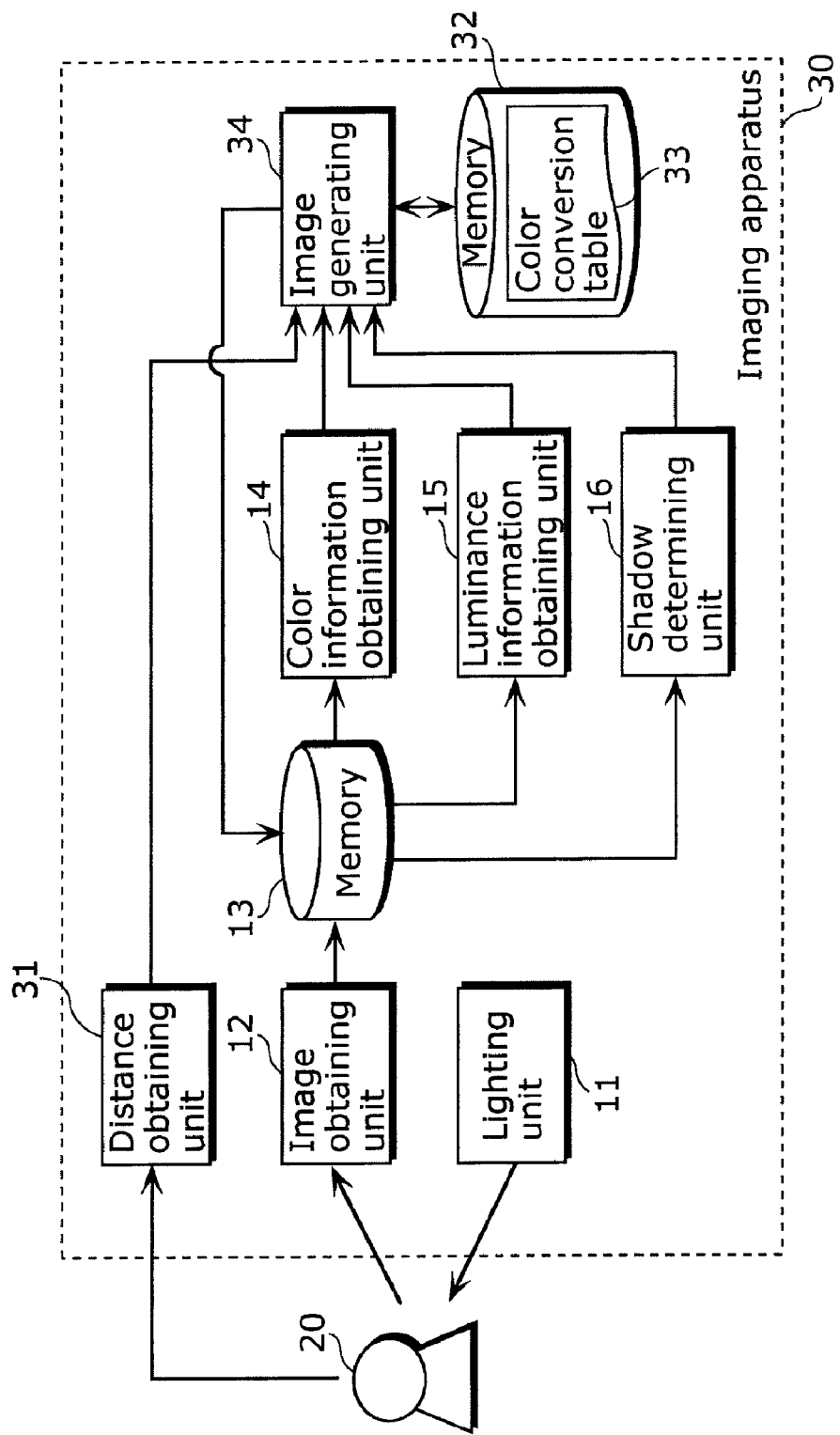
FIG. 9 is a block diagram exemplifying a structure of an imaging apparatus in accordance with an embodiment 2.

FIG. 9 is a block diagram exemplifying a structure of an imaging apparatus 30 in accordance with the embodiment 2. Compared with the imaging apparatus 10 in accordance with the embodiment 1, the imaging apparatus 30 in FIG. 9 additionally includes a distance obtaining unit 31 and a memory 32, and has an image generating unit 34 instead of the image generating unit 17. Mainly described hereinafter are differences between the embodiments 1 and 2, and the points shared therebetween shall be omitted.

The distance obtaining unit 31 obtains distance between the imaging apparatus 30 and the object 20. For example, the distance obtaining unit 31 utilizes the Time of Flight (TOF) technique with a use of an LED to measure the distance. In addition, the distance obtaining unit 31 may utilize another distance obtaining technique with a use of parallax information. The distance obtaining techniques shall be described hereinafter with reference to the drawings.

The memory 32 stores a color conversion table 33. In the color conversion table 33, the distance to the object; a color vector having a small amount of flash, a color vector having a large amount of flash, and a color vector indicating a true value after correction correspond each other. Details and a generation technique of the color conversion table 33 shall be described hereinafter with reference to the drawings.

The image generating unit 34 generates an image by referring to the color conversion table 33 to generate for each pixel the color vector, indicating the true value after correction, corresponding to a color vector obtained by the color information obtaining unit 14, a color vector obtained by the luminance information obtaining unit 15, and distance obtained by the distance obtaining unit 31.

The above structure allows the imaging apparatus 30 in accordance with the embodiment 2 to obtain color information and luminance information out of the most appropriate image for each object by measuring distance. This makes possible creating an image having enough brightness and natural color.

Figure 10:
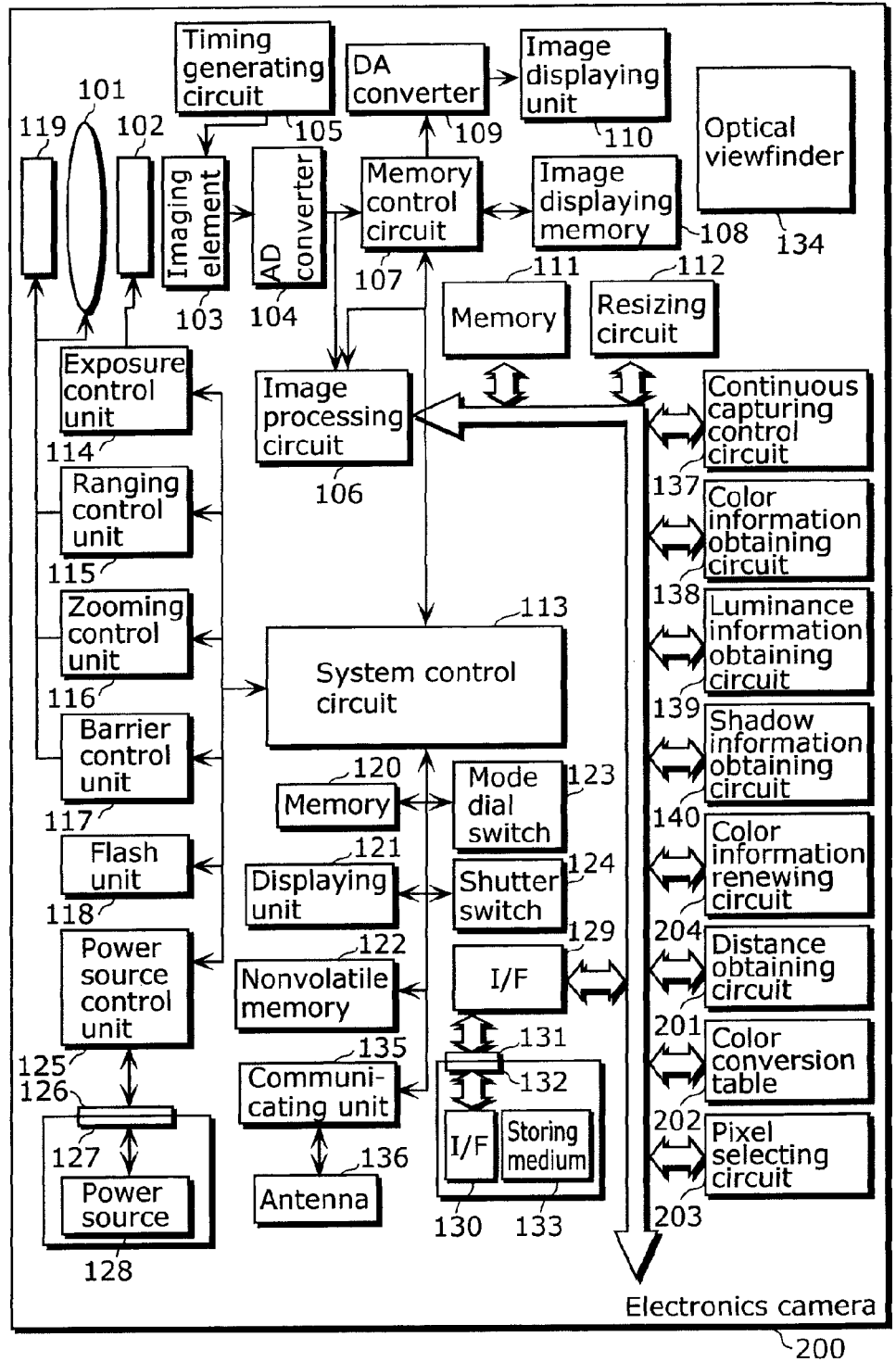
FIG. 10 is a block diagram exemplifying a structure of an electronics camera which is a specific example of the imaging apparatus in accordance with the embodiment 2.

FIG. 10 is a block diagram exemplifying a structure of an electronics camera 200 which is a specific example of the imaging apparatus 30 in accordance with the embodiment 2. Compared with the electronics camera 100 in accordance with the embodiment 1, the electronics camera 200 in FIG. 10 additionally includes a distance obtaining circuit 201, a color conversion table 202, and a pixel selecting circuit 203, and has a color information renewing circuit 204 instead of the color information renewing circuit 141. Mainly described hereinafter are differences between the modification and the embodiment 1, and the points shared therebetween shall be omitted.

The distance obtaining circuit 201 measures the distance with a use of the TOF technique utilizing an LED. The distance obtaining circuit 201 corresponds to the distance obtaining unit 31 in FIG. 9.

The color conversion table 202 is a memory table. In the color conversion table 202, the distance to the object, the color vector having a small amount of flash, and the color vector having a large amount of flash correspond each other. The color conversion table 202 corresponds to the color conversion table 33 in FIG. 9.

The pixel selecting circuit 203 determines for each object a state of receiving the flash to determine an image of which continuous capturing number is used for an object keeping which distance. Here, the state of receiving is determined with a use of the distance obtained by the distance obtaining circuit 201 and the color conversion table 202. The pixel selecting circuit 203 performs selection of a pixel by referring to the color conversion table and using a table value which is close to the measured distance. Only in the case where pixel selection is performed, the pixel selecting circuit 203 stores the value of the selected pixel in the memory 111. Based on the value of the selected pixel, the color information renewing circuit 204 renews the color information.

The color information renewing circuit 204 executes the synthesizing on an original image according to a value of the pixel provided from the pixel selecting circuit 203.

In the case where one of the distance obtaining circuit 201, the color conversion table 202, and pixel selecting circuit 203 is omitted, the system control circuit 113 may execute tracking and renewing via the following flow, using software.

Described next is an operation of the imaging apparatus 30 in accordance with the embodiment 2.

Figure 11:
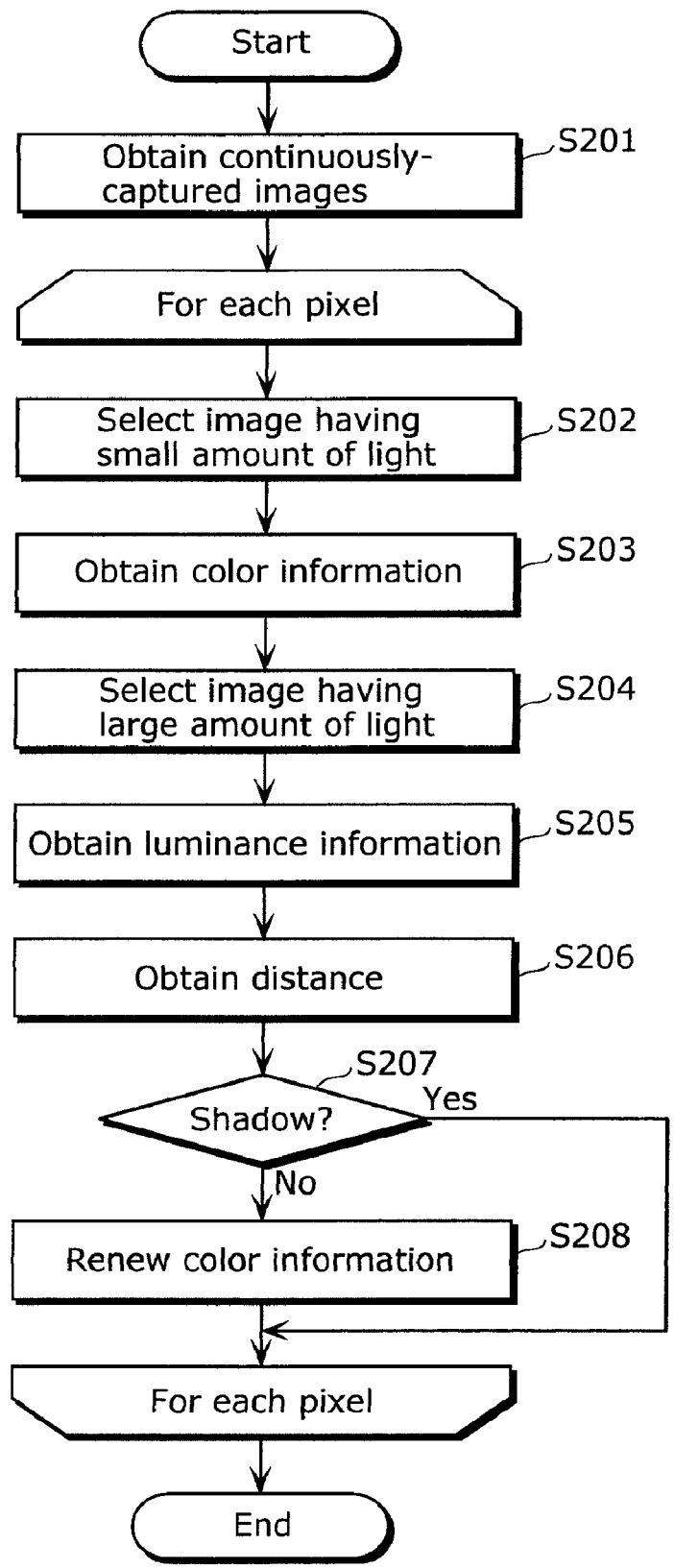
FIG. 11 is a flowchart exemplifying an operation of the imaging apparatus in accordance with the embodiment 2.

FIG. 11 is a flowchart exemplifying an operation of the imaging apparatus 30 in accordance with the embodiment 2.

First, the image obtaining unit 12 obtains continuously-captured images (S201). Specifically, the image obtaining unit 12 obtains the continuously-captured images including plural images when the imaging apparatus 30 continuously photographs the object 20 at a high speed from the time at which the lighting unit 11 starts emitting the flash on the object 20 to the time at which the lighting unit 11 ends emitting the flash on the object 20. The obtained continuously-captured images are stored in the memory 13. In the electronics camera 200, the system control circuit 113 controls each of the processing units and processing circuits to execute the capturing.

Then, sets of processing are executed, for each pixel, on the obtained continuously-captured images. Here, the set of processing are from the color information obtainment (S202) to the color information renewal (S208) as shown below. It is noted that a pixel receiving the set of processing is controlled by a control unit (not shown) in the imaging apparatus 30. In the electronics camera 200, for example, the system control circuit 113 executes the control.

Similar to the embodiment 1, the color information obtaining unit 14 selects an image having little effect of the flash out of the continuously-captured images (S202). Then, the color information obtaining unit 14 obtains as the color information a unit color vector out of the selected image (S203).

Similar to the embodiment 1, next, the luminance information obtaining unit 15 selects out of the continuously-captured images an image which is greatly affected by the flash (S204). Then, the luminance information obtaining unit 15 obtains, out of the selected image, color vector magnitude as the luminance information (S205). Next, the distance obtaining unit 31 obtains the distance to the object with a technique described hereinafter (S206).

It is noted that whichever may be executed in first, the color information obtainment, the luminance information obtainment, or the distance obtainment.

Then, the shadow determining unit 16 determines whether or not a target pixel is shadow (S207). When the target pixel is determined to be shadow (S207: Yes), the color information on the target pixel is not renewed. Then, the next pixel is designated as a target pixel, and the sets of processing are repeatedly executed from the color information obtainment (S202).

When the target pixel is determined not to be shadow (S207: No), the color information on the target pixel is renewed according to the color information, the luminance information, and the distance (S208). When the color information renewal ends, the next pixel is designated as a target pixel, and the sets of processing are repeatedly executed from the obtaining the color information (S202).

Figure 12A:
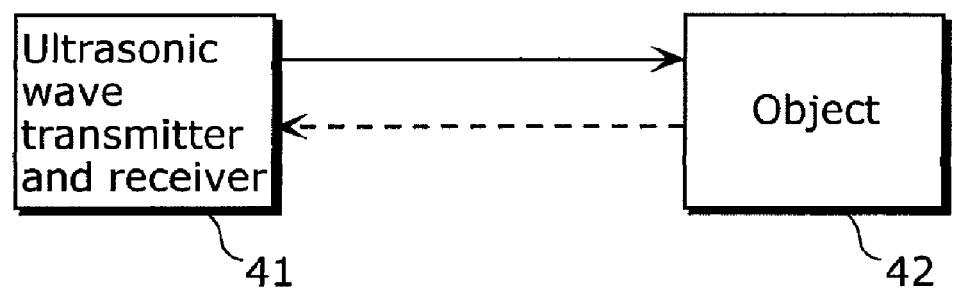
FIG. 12A shows a TOF (Time-of-Flight) distance measuring apparatus employing ultrasonic wave.
Figure 12B:
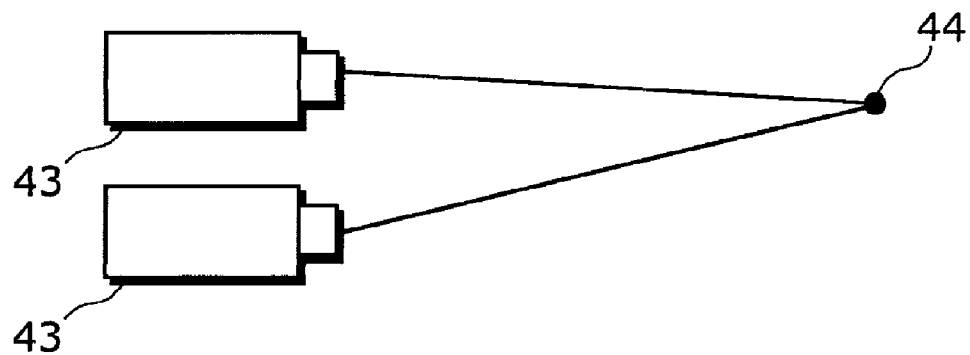
FIG. 12B shows the principle of the stereophonic distance measurement.

Described next is a distance obtaining technique with reference to FIGS. 12A and 12B.

There are two typical techniques for measuring distance; namely, the active technique and the passive technique. Representing the active technique is the TOF technique. The technique involves emitting light from a light source such as an LED or a wave such as an ultrasonic wave to measure the distance according to the time it takes for the light or the wave to reflect on the object and to return. FIG. 12A shows a TOF measuring apparatus employing an ultrasonic wave. As shown in FIG. 12A, the TOF measuring apparatus measures distance according to the time it takes, for an ultrasonic wave, from being emitted by an ultrasonic wave transmitter and receiver 41 at a regular interval, reflected on the object 42, and to be received by the ultrasonic wave transmitter and receiver 41.

Meanwhile, representing the passive technique is a stereoscopic technique which employs plural lenses. FIG. 12B shows the principle of the stereophonic distance measurement. As shown in FIG. 12B, the technique uses two stereoscopic cameras 43 to measure distance to a measured object 44 by triangulation. Given the distance between the two stereoscopic cameras 43, the distance to the measured object 44 can be calculated.

Figure 13:
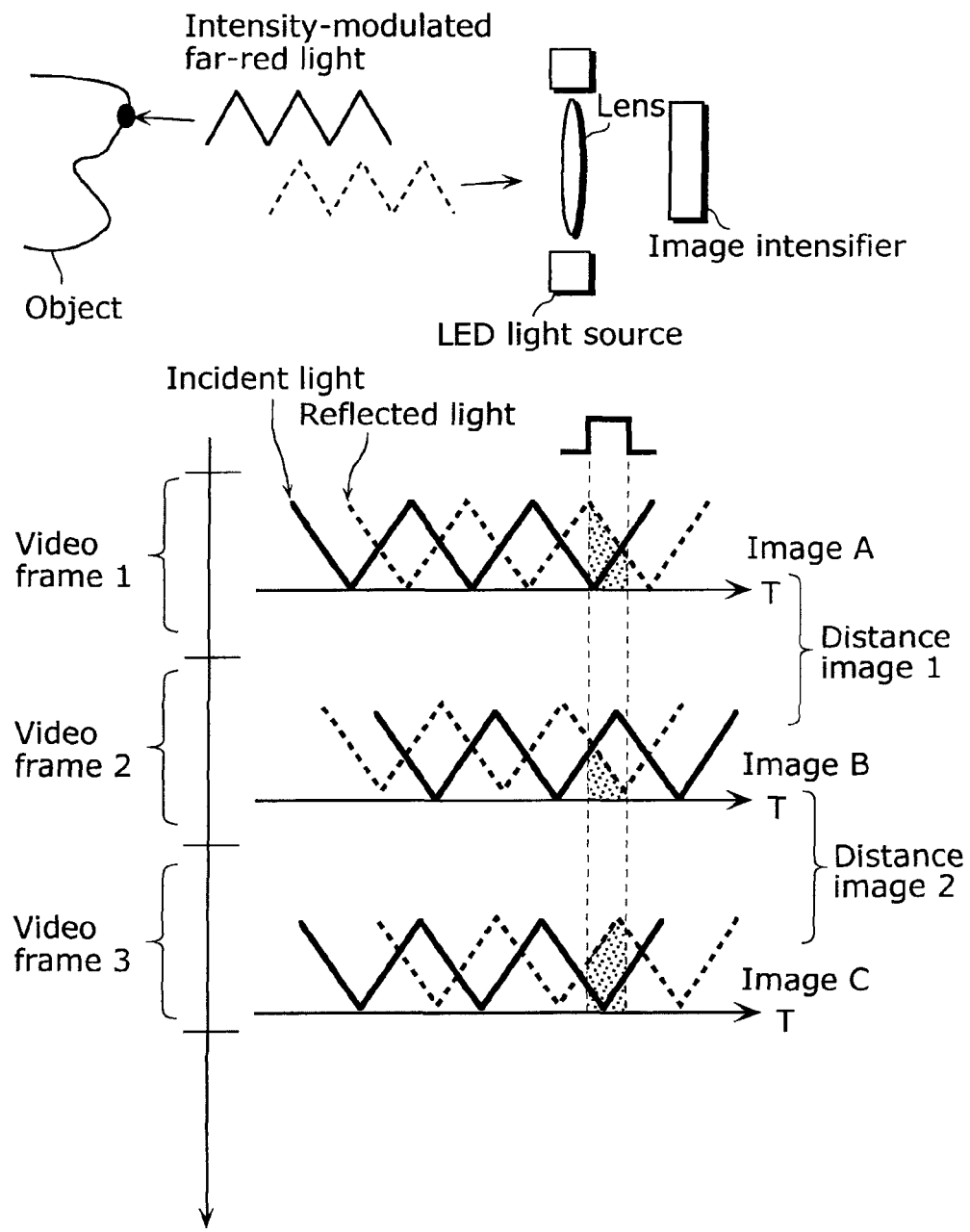
FIG. 13 shows the basic principle of the TOF distance measurement.

FIG. 13 shows the principle of the TOF distance measurement. The technique involves obtaining the distance with a use of the time difference of light traveling between the camera and the object. A camera-based light source emits intensity-modulated far-red light to the object, and then, an image intensifier and a CCD camera capable of releasing high-speed shutter photograph reflected light which is reflected on the object for a short period of time. When capturing an image "A" with the opening of the camera shutter timed to reflected light of which light intensity is increase-modulated, a time of the light traveling between the camera and the object varies depending on the distance to the object. Thus, the distance is taken into consideration on the luminance of the captured image "A". The image "A", however, is influenced by a reflectance of the object and spatial unevenness of the amount of emitted light, as well. In order to correct these, the camera captures an image "B" with the opening of the camera shutter timed to reflected light of which light intensity is decrease-modulated in the next video frame. Here, a luminance ratio between the images "A" and "B" in successive frames is calculated. This luminance ratio is used for correcting the influence of the reflectance, and a distance image showing the distance to the object in contrast of the image is obtained. Sequential repetition of the processing makes possible obtaining the distance image of the object at a video frame rate.

Figure 14:
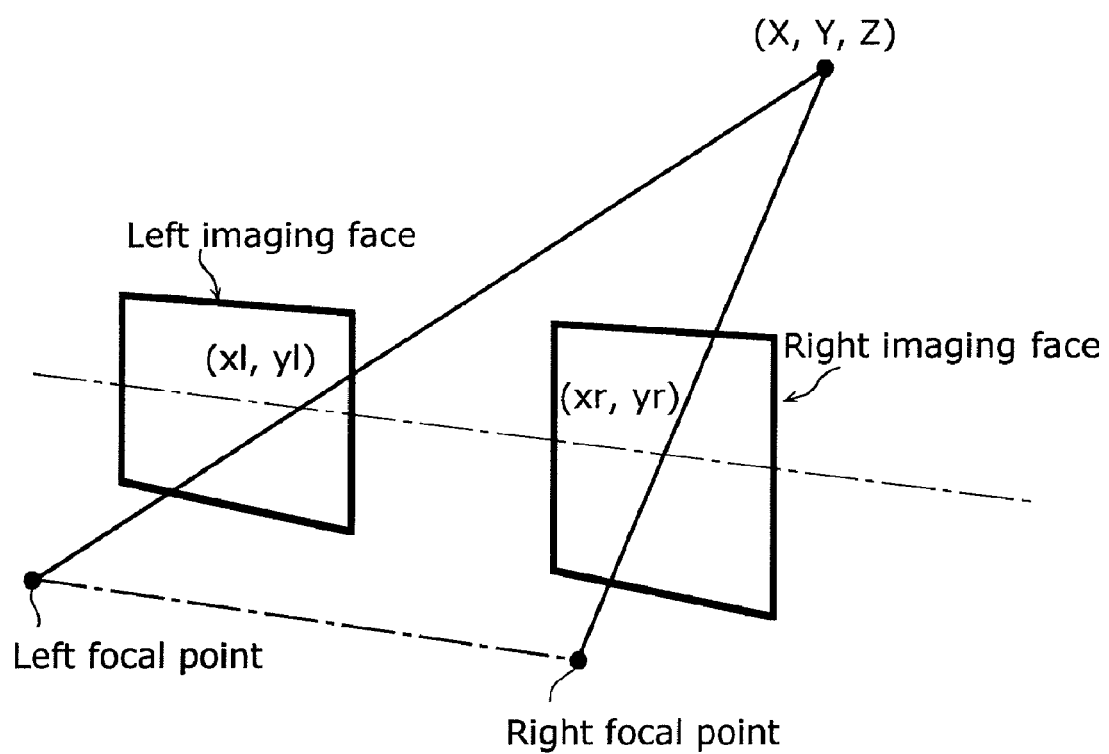
FIG. 14 is a conceptual diagram of the stereophonic distance measurement.

FIG. 14 shows the basic principle of the stereophonic distance measurement. For simplification, described are two stereoscopic cameras having the same specifications and placed in parallel. By calibrating the cameras, an internal parameter (in-camera information such as focusing length) and an external parameter (three-dimensional position of the camera) are obtained. Taking advantage of the parameters, the in-camera specification can be easily modified and the two cameras can be easily handled as if they were placed in parallel. First, the two cameras are placed as shown in FIG. 14. Here, the cameras are placed so that the optical axes of the two cameras are set in parallel, and the horizontal axes to the imaging face (x-axes) match (that is, the two x-axes are leveled off each other). Here, (X, Y, Z) are actual spatial coordinate systems with the focal point of the right camera designated as the origin. (xl, yl) and (xr,yr) are sets of coordinate systems on respective imaging faces of the left and the right cameras. Here, (xl, yl) and (xr,yr) are the coordinate systems with the intersection point of the axes of the cameras designated as the origin. In addition, X, xl, and xr axes are all matched in a direction from the focal point of the left camera to the focal point of the right camera.

According to the above, "yl=yr" is assumed. Here, the relationship among a point P (X, Y, Z) in an actual space, and projection points ml (xl, yr) and mr (xr, yr) at the left camera and the right camera holds as Equations 5 show:

[Math 3]

$$Z = \frac{Bf}{xl - xr}, \quad X = \frac{Z}{f}xr, \quad Y = \frac{Z}{f}yr \quad \text{(Equation 5)}$$

Here, "B" and "f", both of which are constant numbers, are assumed to be distance between the cameras and focusing length, respectively. By measuring "xl–xr" (parallax), "Z" can be calculated. Thus, the coordinates of the point P to be measured (X, Y, Z) can be calculated.

In the embodiment 2, either the active technique or the passive technique may be used. It is noted that the active technique requires the user to capture an image once the user ends emitting the flash, and the passive technique requires plural lenses. Meanwhile, the cameras are not necessarily equipped with a distance measuring sensor. The distance may be measured on a separate device, and the measured data may be obtained. Using the distance information obtained by the circuit and a table described below, the continuously-captured images are selected.

Figure 15A:
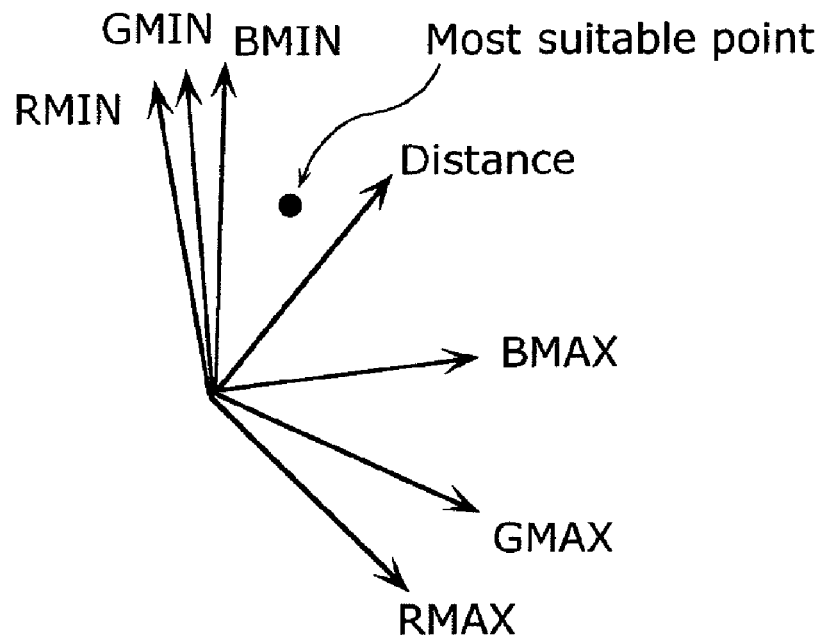
FIG. 15A shows a relationship, in the RGB color space, among a distance, color vectors observed when there is a small amount of a flash, and color vectors observed when there is a large amount of flash.
Figure 15B:
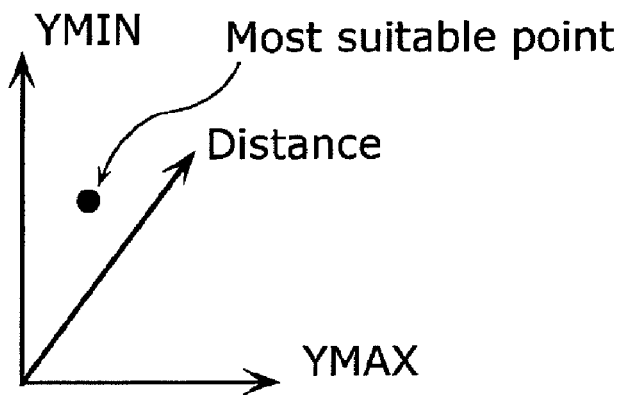
FIG. 15B shows a relationship, either in the YCrCb or the YUV color space, among distance, color vectors observed when there is a small amount of flash, and color vectors observed when there is a large amount of flash.

Next described is a table indicating distance, a color having a small amount of the flash, and a color having a large amount of the flash, with reference to FIGS. 15A, 15B, and 16.

FIG. 15A shows a relationship, in the RGB color space, among a distance, color vectors observed when there is a small amount of the flash, and color vectors observed when there is a large amount of the flash. FIG. 15B shows a relationship, either in the YCrCb or the YUV color space, among distance, color vectors observed when there is a small amount of flash, and color vectors observed when there is a large amount of flash.

The most suitable color to be required can be obtained by preparing, in advance, for a table which relates, for each pixel, (i) the obtained distance and the colors having a small amount of the flash and a large amount of the flash to (ii) a color close to natural light.

In the case where the RGB color space is used, for example, obtaining the most suitable color is to find one point (the most suitable point shown in FIG. 15A) in a seven-dimensional space in total including: the distance; "RMIN", "GMIN", and "BMIN" having a small amount of the flash; and the "RMAX", "GMAX", and "BMAX" having a large amount of the flash. This allows the most suitable color to be obtained by simply referring to the table even in the case where there are plural objects with each distance different.

It is noted that the color space may be the YCrCb color space instead of the RGB color space. The use of the YCrCb or the YUV color space may require a change of the luminance component alone, without changing the color component. Thus, only the luminance component can be used as an argument of the table, so that the seven-dimensional space can be compressed into a three-dimensional space. Hence, obtaining the most suitable color is to find one point (the most suitable point shown in FIG. 15B) in the three-dimensional space including: the luminance "YMIN" having a small amount of the flash; the luminance "YMAX" having a large amount of the flash; and the distance.

FIG. 16 exemplifies a color conversion table for the RGB color space.

As shown in FIG. 16, the color conversion table 33 relates each of the most suitable values for RGB. Here, the most suitable values correspond to: "RMIN", "GMIN", and "BMIN" having a small amount of the flash; "RMAX", "GMAX", and "BMAX" having a large amount of the flash; and the distance.

The image generating unit 34 compares: the color vector obtained by the color information obtaining unit 14 with "RMIN", "GMIN", and "BMIN"; and the color vector obtained by the luminance information obtaining unit 15 with the "RMAX", "GMAX", and "BMAX". Further, the image generating unit 34 compares the distance obtained by the distance obtaining unit 31 with the distance "l" in FIG. 16, so that the image generating unit 34 can generate each of the most suitable RGB values corresponding to all the values.

Described next is a color conversion table generating technique. Here, two learning techniques are introduced.

A first technique involves printing a color on paper in a dark environment, and photographing the paper with the camera being kept away from the paper. In this method, the distance from the camera can be known distance. Further, by repeating three different patterns of capturing; that is, under ON and OFF of the flash, and natural light, obtained are relations among (i) the distance, (ii) the brightness when the flash is ON and the brightness when the flash is OFF, and (iii) what the color is like under the natural environment in the three conditions. Holding the relations as a table makes possible determining a unique color under the natural environment with respect to three parameters (distance, an image having a small amount of the flash, and an image having a large amount of the flash) observed in an actual capturing.

A second technique involves utilizing a projector and a dynamically-movable plane surface. When the plane is placed in known distance, a color is projected from the projector under natural environment, and the projected color is photographed with a camera. Then, the dark environment is provided with the plane kept as is, and the capturing is executed in two ways; that is, the cases where a small amount and a large amount of the flash are emitted. The second technique is executed by either performing the capturing while moving the plane, or changing the color projected from the projector. The use of the second technique makes possible obtaining two pieces of the color information each having different amount of the flash, a color under the natural environment, and the distance from the camera to the object under the natural environment.

It is noted for example that another technique may as well be utilized as far as relations between two colors, each having different brightness and distance, are obtained with another technique using the projector.

A table utilized in the embodiment 2 is the color conversion table including distance information and the information of the flash; meanwhile, the imaging apparatus may recognize what the object is like, and select the best information suitable for the recognition.

The above has described a color-optimizing synthesizing technique with a use of the table. Similar to the embodiment 1, meanwhile, calculating a color with a use of the following equation makes possible generating the most suitable image for each object.

Light arriving at each place has a feature to attenuate as much as one square-th of distance. Thus, a relation of the most suitable brightness for each pixel changes at a rate in proportion to one square-th, with a certain place as a reference point. In the case where distance between each pixel and the object is found, the most suitable brightness can be calculated with a use of Equation 6 where brightness is determined for a certain point:

[Math 4]

$$\begin{bmatrix} R5 \\ G5 \\ B5 \end{bmatrix} = \begin{bmatrix} R4 \\ G4 \\ B4 \end{bmatrix} \left( \frac{l_1^2}{l_2^2} \right)$$ (Equation 6)

In Equation 6, "R4", "G4", and "B4" are original colors. For example, the colors "R4", "G4", and "B4" are "R3", "G3", and "B3" calculated according to Equation 4. Colors "R5", "G5", and "B5" are corrected in brightness. "l1" is distance to an object in a pixel to be referenced in brightness, and "l2" is distance to an object in a pixel to be targeted. By changing the brightness only for the ratio of "l1" to "l2", an image with the brightness corrected by calculation can be obtained without a large table.

Embodiment 3

An imaging apparatus in accordance with an embodiment 3 obtains continuously-captured images including plural images each having different luminance by changing an amount of a flash in each obtaining of an image when continuously capturing an object.

Figure 17:
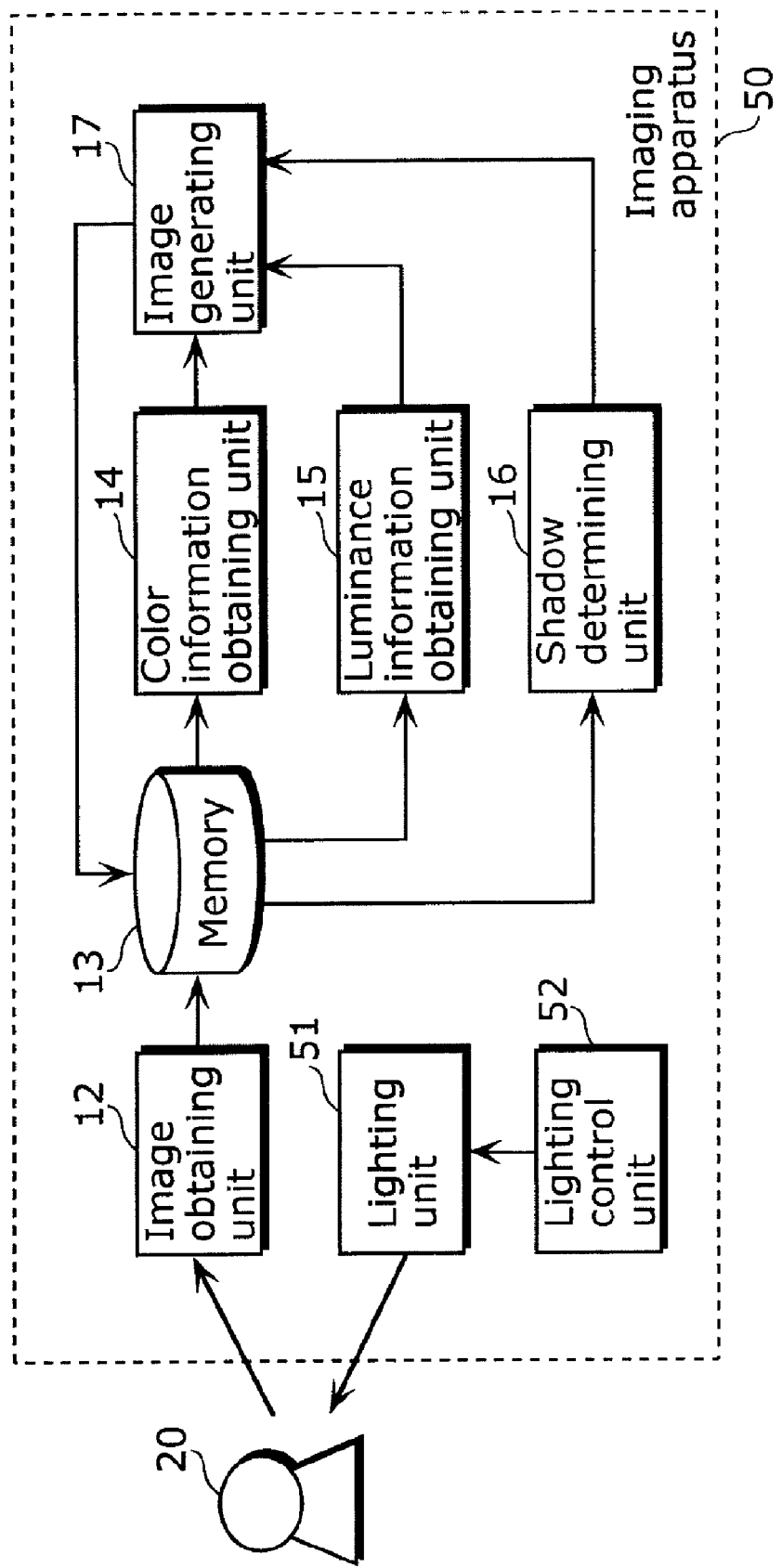
FIG. 17 is a block diagram exemplifying a structure of an imaging apparatus in accordance with an embodiment 3.

FIG. 17 is a block diagram exemplifying a structure of an imaging apparatus 50 in accordance with the embodiment 3. Compared with the imaging apparatus 10 in accordance with the embodiment 1, the imaging apparatus 50 is different in including a lighting unit 51 instead of the lighting unit 11, and in having an additional lighting control unit 52. Mainly described hereinafter are differences between the embodiments 1 and 3, and the points shared therebetween shall be omitted.

The lighting unit 51 is an LED which can change an amount of flash, for example. The lighting unit 51 emits, to the object 20, the flash of which amount is predetermined by the lighting control unit 52.

The lighting control unit 52 controls the amount of flash emitted from the lighting unit 51. Specifically, the lighting control unit 52 controls the lighting unit 51, according to a continuous capturing speed of the imaging apparatus 50, to change the amount of flash so that the amount of flash is different for each of obtained images.

The above structure allows the amount of the flash to be changed for each obtaining of an image, which makes possible surely obtaining the continuously-captured images including the plural images each having different luminance.

For example, the embodiments 1 and 2 assume a case of fast continuous capturing speed. In this case, continuously photographing the object allows both of an image having a small amount of the flash and an image having a large amount of the flash to be obtained while the flash is emitted once. In the embodiments 1 and 2, however, a fast-enough continuous capturing speed is not always available. Thanks to the above structure, an imaging apparatus in accordance with the embodiment 3 makes possible obtaining the continuously-captured images including the plural images each having different luminance even though the continuous capturing speed is slow.

Figure 18:
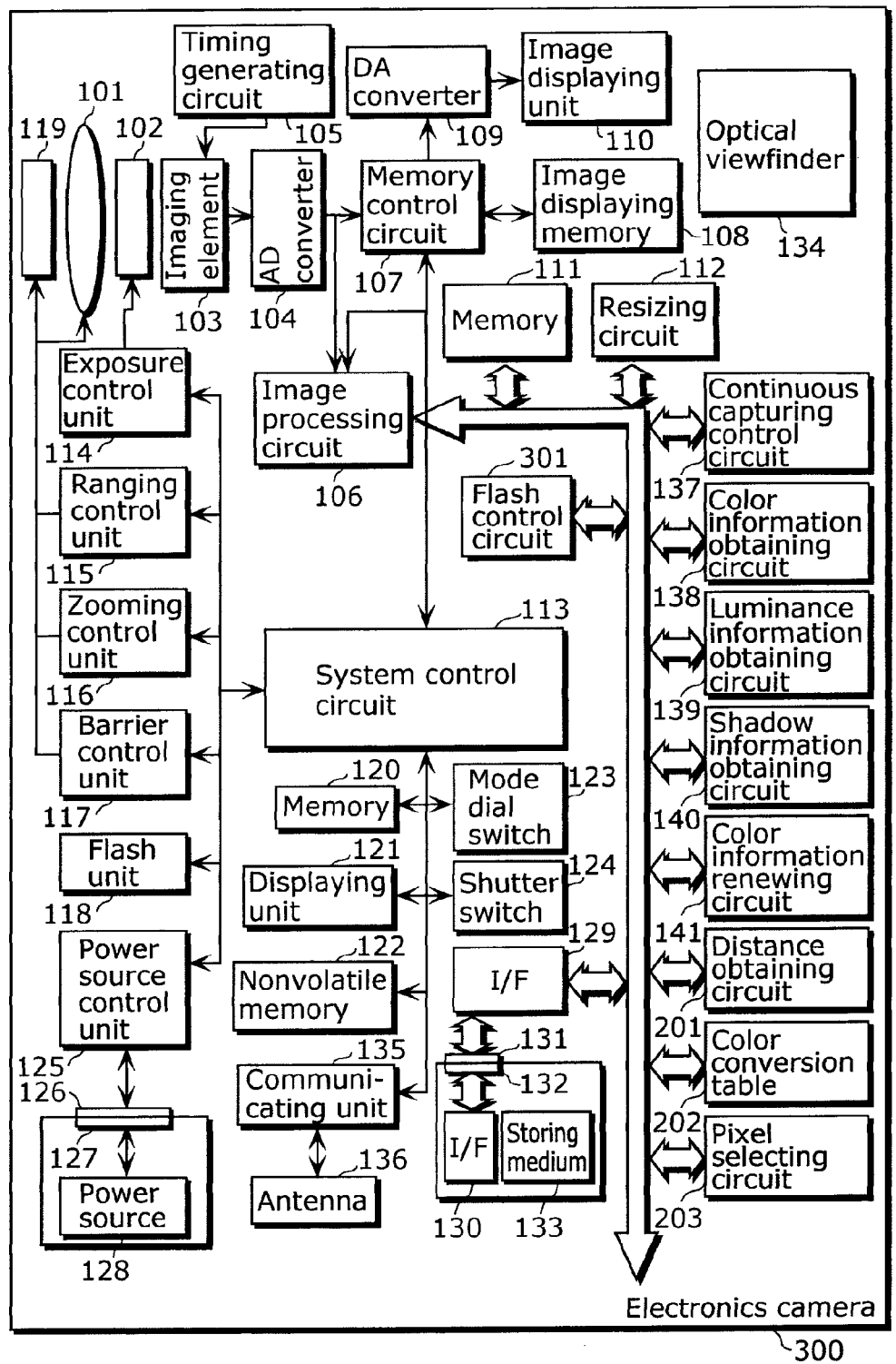
FIG. 18 is a block diagram exemplifying a structure of an electronics camera which is a specific example of the imaging apparatus in accordance with the embodiment 3.

FIG. 18 is a block diagram exemplifying a structure of an electronics camera 300 which is a specific example of the imaging apparatus 50 in accordance with the embodiment 3. Compared with the electronics camera 200 in accordance with the embodiment 2, the electronics camera 300 in FIG. 18 is different in including an additional flash control circuit 301. Mainly described hereinafter are differences between the embodiment 2, and the points shared therebetween shall be omitted.

The flash control circuit 301 controls an amount of light emitted from the flash unit 118. The flash control circuit 301 corresponds to the lighting control unit 52 in FIG. 17.

In the case where the flash control circuit 301 is omitted, the system control circuit 113 may execute tracking and renewing, using software, as described hereinafter.

Figure 19:
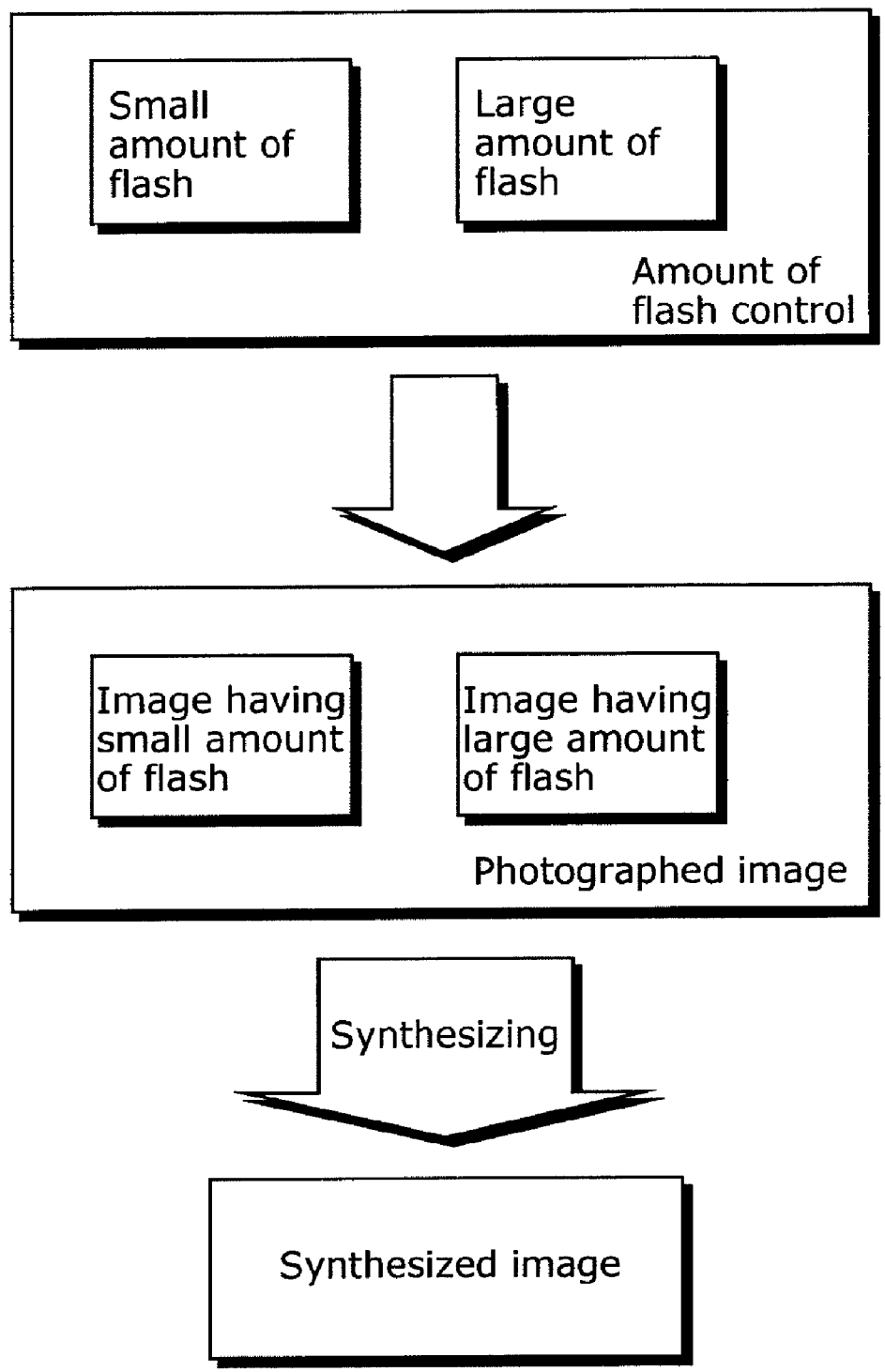
FIG. 19 shows a flow of controlling an amount of a flash and generating a synthetic image out of a captured image.

FIG. 19 shows a flow of controlling an amount of the flash and generating a synthetic image out of a captured image.

As shown in FIG. 19, the flash control circuit 301 included in the electronics camera 300 executes photographing with a small amount of flash and with a large amount of flash. This makes possible obtaining images having: a small amount of the light emitted to the object; a large amount of the light emitted to the object. A smaller number of capturing with the amount of light changed is set when the number of objects is small. A larger number of the capturing with the amount of light changed is set in the case where plural objects, to each of which distance is different, are found.

As described above, images are captured with the amount of the light changed, and, similar to the embodiments 1 and 2, colors are synthesized out of the captured images including an image having little effect of the flash and an image affected by the flash. Through the synthesizing, obtained is a color close to coloring to be obtained in the natural light capturing.

According to the embodiment 3, even a camera of which continuous capturing speed is slow and a compact camera which cannot measure distance can make a synthesized image which is free from the effect of the flash by performing plural times of continuous capturing with the amount of the flash changed.

It is noted that in the case where obtained two images have the same composition; that is the case where the object is stationary, the image is not necessarily obtained via the continuous capturing.

Embodiment 4

An imaging apparatus in accordance with the embodiment 4 includes plural lighting units each placed at a different position. Sequentially lighting each of the lighting units obtains an associated continuously-captured images corresponding to the lighting of a corresponding lighting unit. Out of each of the continuously-captured images, a corresponding corrected image is generated based on the embodiment 1. With a use of the plural corrected images, a shadow-corrected image is generated. In the shadow-corrected image, shadow caused by lighting of the lighting unit is corrected. Described hereinafter is a structure of the imaging apparatus in accordance with the embodiment 4, with reference to FIG. 20.

Figure 20:
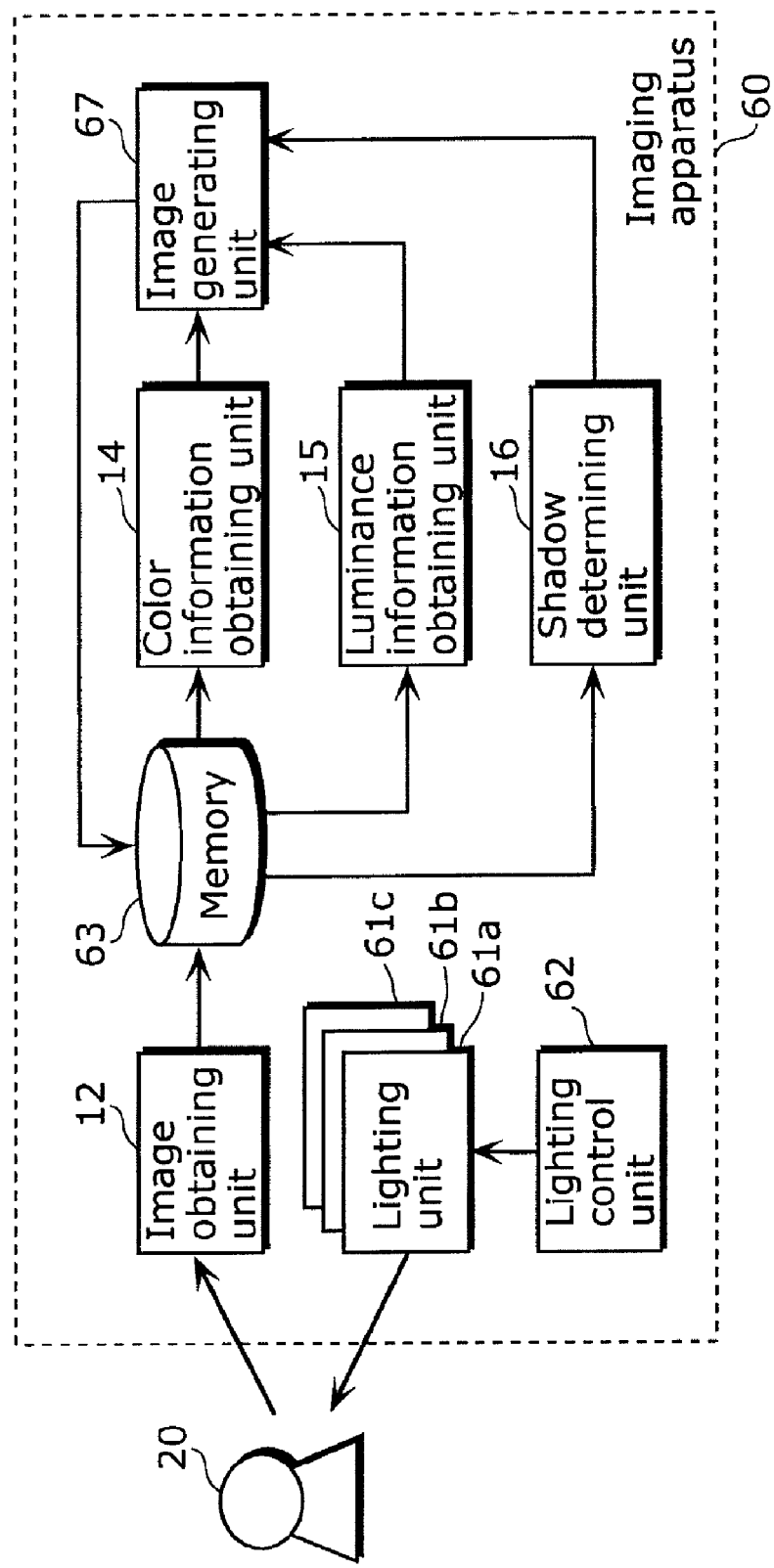
FIG. 20 is a block diagram exemplifying a structure of an imaging apparatus in accordance with an embodiment 4.

FIG. 20 is a block diagram exemplifying a structure of an imaging apparatus 60 in accordance with the embodiment 4. Compared with the imaging apparatus 10 in accordance with the embodiment 1, the imaging apparatus 60 in FIG. 20 is different in including plural lighting units 61a, 61b, and 61c, instead of the lighting unit 11, a memory 63 instead of the memory 13, an image generating unit 67 instead of the image generating unit 17, and additionally having a lighting control unit 62. Mainly described hereinafter are differences between the embodiments 1 and 4, and the points shared therebetween shall be omitted The lighting units 61a, 61b, and 61c are placed at a different position each other, and emit the flashes to the object 20. Lighting timing of each of the lighting units 61a, 61b, and 61c is controlled by the lighting control unit 62. For example, the lighting units 61a, 61b, and 61c sequentially emit the flashes to the object 20 so as not to simultaneously emit, to the object 20, all the flashes from the lighting units 61a, 61b, and 61c.

The lighting control unit 62 controls the lighting timing of each of the lighting units 61a, 61b, and 61c. For example, the lighting control unit 62 sequentially lights the lighting units 61a, 61b, and 61c. Specifically, when the lighting unit 61a finishes emitting the flash to the object 20, the lighting control unit 62 causes the lighting unit 61b to start emitting the flash. When the lighting unit 61b finishes emitting the flash to the object 20, the lighting control unit 62 causes the lighting unit 61c to start emitting the flash. Thus, the lighting control unit 62 controls the lighting units 61a, 61b, and 61c, so that each of the flashes emitted by the lighting units 61a, 61b, and 61c is not simultaneously emitted to the object 20.

The memory 63 stores continuously-captured images obtained by the image obtaining unit 12. Since the image obtaining unit 12 obtains the continuously-captured images corresponding to associated lighting units 61a, 61b, and 61c, the memory 63 stores plural continuously-captured images. Similar to the embodiment 1, each of the continuously-captured images includes plural images each having a different amount of light (or luminance).

The memory 63 further stores plural corrected images generated by the image generating unit 67. Moreover, the memory 63 associates a determination result provided by the shadow determining unit 16 with each of the correct pictures, and stores the determination result. Specifically, the memory 63 associates a piece of information with each of the corrected images, the piece of information which indicates for each pixel whether or not a target pixel represents shadow caused by the flash.

Each of the color information obtaining unit 14, the luminance information obtaining unit 15, and the shadow determining unit 16 performs processing similar to that described in the embodiment 1. It is noted that there are plural continuously-captured images obtained in the embodiment 4, and thus each processing unit performs processing similar to that described in the embodiment 1 for each of the continuously-captured images.

The image generating unit 67 generates a corrected image of which luminance is greater than that of the image selected by the color information obtaining unit 14 by generating for each pixel a color vector corresponding to color information and luminance information of the target pixel. The generated corrected image is stored in the memory 63. It is noted that the image generation is executed only on a pixel which is not determined as shadow by the shadow determining unit 16.

Further, the image generating unit 67 (i) uses the corrected image generated for each continuously-captured images and the determination result provided by the shadow determining unit 16 to correct the shadow caused by the flash, and (ii) generates a shadow-corrected image with effect of the shadow corrected. Here, the image generating unit 67 may correct effect of all shadow without identifying kinds of the shadow, including shadow caused by the flash and an original shadow which is free from the effect of the flash. There is a case, however, where a pixel value of an area of the original shadow is possibly replaced with a pixel value of an area which is used to be shadow due to the flash emitted from another direction. In this case, an image having a sense of unnaturalness is created; therefore, it is desirable to replace the pixel value only for the shadow caused by the flash.

For example, the image generating unit 67 selects two corrected images out of the plural corrected images stored in the memory 63. Then, with a use of the determination result provided by the shadow determining unit 16, the image generating unit 67 specifies for each pixel a pixel which is (i) determined as the shadow caused by the flash in one of the two corrected images, and (ii) determined not as the shadow caused by the flash in the other one of the two corrected images. Further, on the specified pixel, the image generating unit 67 replaces the pixel value of the pixel in the shadow-corrected image with a pixel value of the corrected image which has been determined not as the shadow. It is noted that the pixel in the shadow-corrected image other than the specified pixel may be a pixel in either one of the two corrected images.

Specifically, the image generating unit 67 selects two corrected images out of the plural corrected images stored in the memory 63, and designates one of the two corrected images as a base image and the other as a comparison image. Then, with a use of the determination result provided by the shadow determining unit 16, the image generating unit 67 specifies for each pixel a pixel which is (i) determined as the shadow caused by the flash in the base image, and (ii) determined not as the shadow caused by the flash in the comparison image. Finally, in the base image, the image generating unit 67 replaces the pixel value of the specified pixel with the pixel value of the comparison image.

When the specification and the replacement of the pixel are executed to all the pixel in the base image, the image generating unit 67 selects another corrected image as the comparison image, and continue the above processing. Then, the image generating unit 67 either provides a base image as the shadow-corrected image, or stores the base image in the memory 63, the base image which is obtained when similar processing has been executed to all the corrected images.

It is noted that the image obtaining unit 12 obtains the continuously-captured images including the plural images each having different luminance while each of the lighting units 61a, 61b, and 61c is emitting the flash to the object 20. The timing of the image obtaining unit 12 obtaining each of the plural continuously-captured images is synchronized with each of the lighting units 61a, 61b, and 61c, which is for example controlled by the lighting control unit 62.

As shown in the above structure, the imaging apparatus 60 in accordance with the embodiment 4: includes the plural lighting units 61a, 61b, and 61c; obtains the continuously-captured images each associated with the lighting units 61a, 61b, and 61c; and generates the corrected image out of the obtained continuously-captured images. In addition, the imaging apparatus 60 corrects the area which has become shadow due to the flash with a use of the plural corrected images. As described above, the imaging apparatus 60 in accordance with the embodiment 4 cancels the shadow caused by the flash with a use of another image to generate a natural image, eliminating effect of the shadow caused by the flash.

Figure 21:
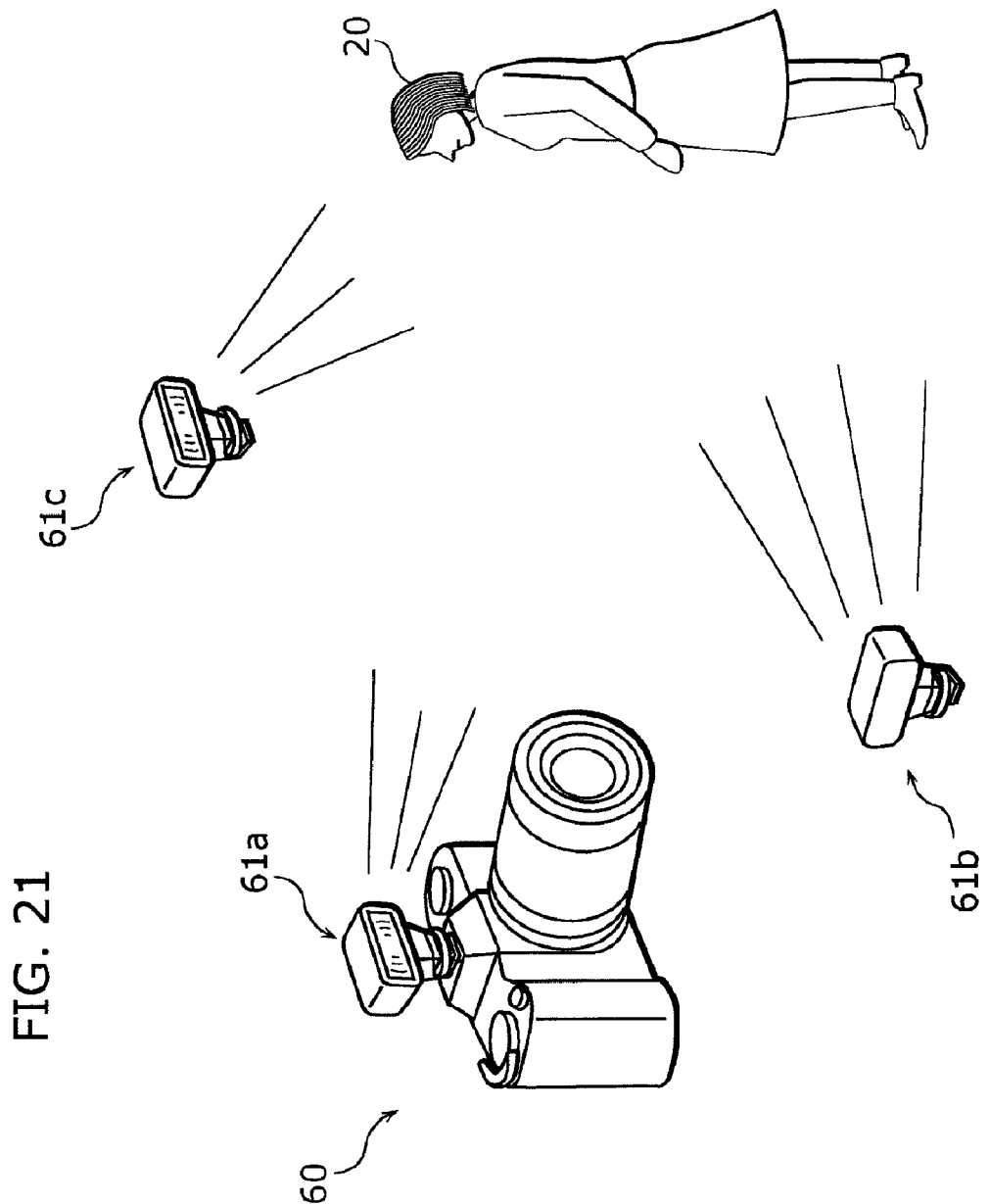
FIG. 21 exemplifies a positional relationship between an object, the imaging apparatus, and lighting units in accordance with the embodiment 4.

FIG. 21 exemplifies a positional relationship between the object 20, the imaging apparatus 60, and the lighting units 61a, 61b, and 61c in accordance with the embodiment 4.

As shown in FIG. 21, each of the lighting units 61a, 61b, and 61c is placed at a different position. For example, the lighting units 61a, 61b, and 61c are positioned so that shadows caused by the flashes of the lighting units 61a, 61b, and 61c are different each other. FIG. 21 exemplifies that the lighting unit 61a is placed in front of the object 20, the lighting unit 61b to the right of the object 20, and the lighting unit 61c to the left of the object 20.

It is noted that the lighting units 61a, 61b, and 61c are preferably placed in distance each other, as shown in FIG. 21. Thus, the lighting units 61a, 61b, and 61c are controlled for example by the lighting control unit 62 via wireless.

In addition, the base image is preferably a corrected image corresponding to a lighting unit positioned closest to a lens and an imaging device (image obtaining unit 12) included in the imaging apparatus 60. In other words, the image generating unit 67 selects as the base image a corrected image corresponding to a lighting unit positioned closest to the user operating the imaging apparatus 60. According to the example shown in FIG. 21, the base image to be selected is a corrected image generated out of the continuously-captured images captured while the flash is being emitted from the lighting unit 61a.

In the imaging apparatus 60 in accordance with the embodiment 4, the pixel determined as the original shadow, out of the pixels included in the base image, cannot be replaced with a pixel in another corrected image (comparison image). Thus, the shadow-corrected image is successively affected by the base image. Thus, in order to generate a natural shadow-corrected image giving the user the same impression as the user receives when the user sees the object 20, the image generating unit 67 preferably selects as a base image the corrected image corresponding to a lighting unit positioned to the user as close as possible.

FIG. 22 exemplifies a database showing a shadow determination result corresponding to each corrected image and each pixel. The database shown in FIG. 22 is stored in the memory 63. It is noted that the database stores a corresponding pixel value for each corrected image and each pixel (not shown).

The lighting units 61a, 61b, and 61c are each placed in a different position. Since the flashes are emitted to object 20 from different direction, a different pixel is determined to be shadow for each corrected image, as shown in FIG. 22. For example, corrected images "A", "B", and "C" correspond to the associated lighting units 61a, 61b, and 61c. It is noted the circles shown in FIG. 22 denote non-shadow pixels.

For example, the image generating unit 67 selects the base image and the comparison image out of the plural corrected images "A", "B", and "C" to compare shadow determination results for each pixel. Here, the corrected image "A" is assumed to be selected as the base image. When the image generating unit 67 selects the corrected image "B" as the comparison image, the pixel having the pixel number "3" represents shadow in the corrected image "A" and does not represent the shadow in the corrected image "B". Thus, the pixel value of the pixel having the pixel number "3" can be replaced with the pixel value of the corrected image "B".

Next, the corrected image "C" is selected as the comparison image. The pixel having the pixel number "4" represents shadow in the corrected image "A" and does not represent the shadow in the corrected image "C". Thus, the pixel value of the pixel having the pixel number "4" can be replaced with the pixel value of the corrected image "C".

As described above, by selecting one corrected image as the base image and another corrected image as the comparison image and comparing the shadow determination results, out of the pixels determined as shadow in the base image, the pixels determined as shadow in the base image can be sequentially replaced with pixels determined not as shadow in the comparison image. This generates the shadow-corrected image with the area determined as shadow corrected, the area which is in an image selected as the base image.

It is noted that a pixel determined as shadow in any corrected image, such as the pixel having the pixel number "2" shown in FIG. 22, is not replaced.

Described next is an operation of the imaging apparatus 60 in accordance with the embodiment 4.

Figure 23:
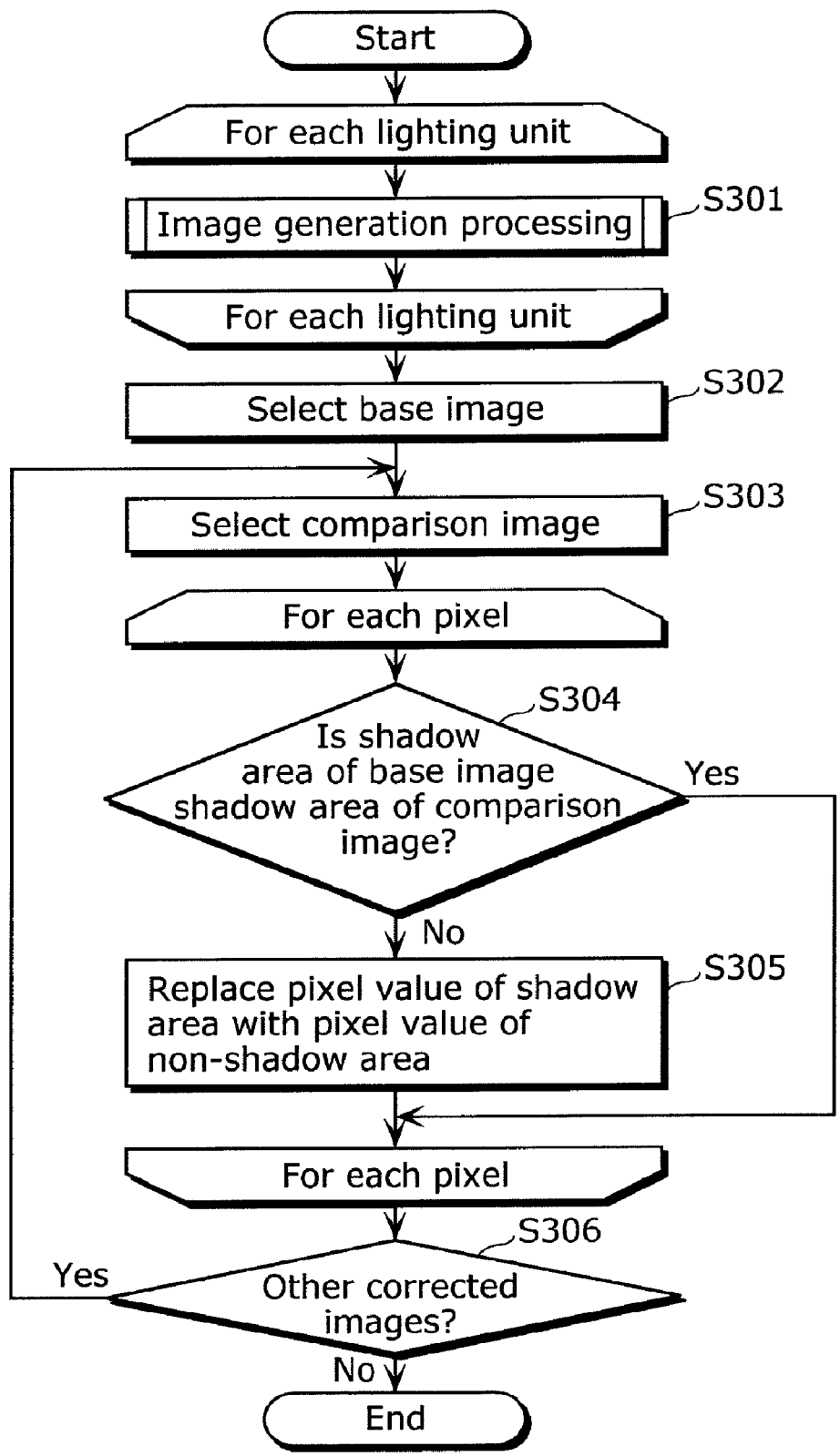
FIG. 23 is a flowchart exemplifying an operation of the imaging apparatus in accordance with the embodiment 4.
Figure 24B:
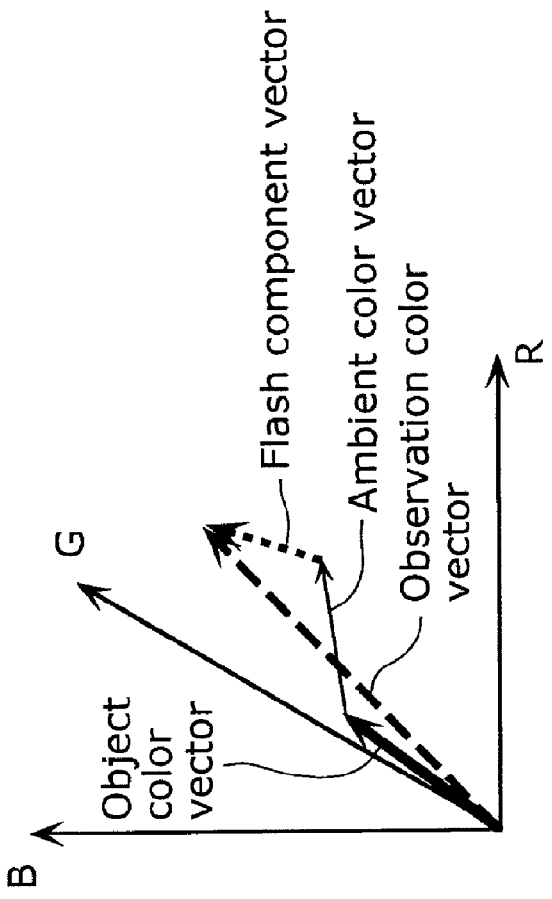
FIG. 24B shows color vectors sensed by a human when flash is emitted.
Figure 24A:
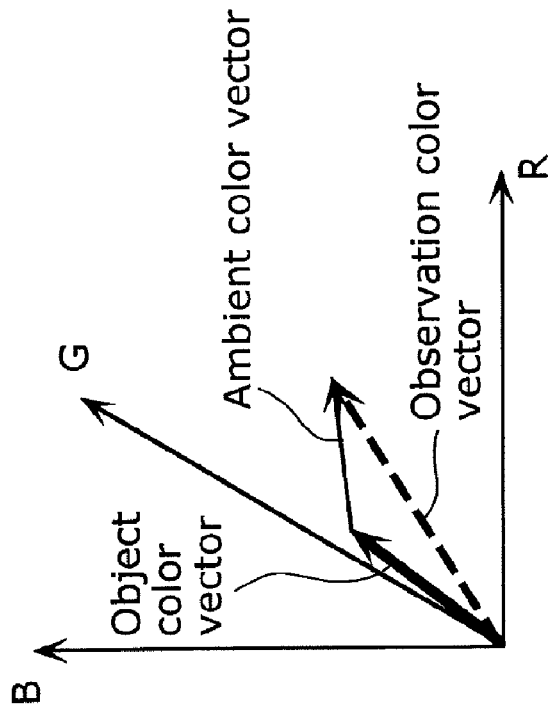
FIG. 24A shows color vectors sensed by a human when no flash is emitted.

FIG. 23 is a flowchart showing an operation of the imaging apparatus 60 in accordance with the embodiment 4.

First, the imaging apparatus 60 executes image generation processing for each lighting unit (S301). Specifically, the lighting control unit 62 determines an operating order of the lighting units 61a, 61b, and 61c. According to the determined order, each of the lighting units 61a, 61b, and 61c emits the flash to the object 20. Then, following the flowchart shown in FIG. 4, the imaging apparatus 60 obtains the continuously-captured images corresponding to the lighting units 61a, 61b, and 61c, and generates a corrected image out of the obtained continuously-captured images. The generated corrected image is stored in the memory 63. In addition, a determination result provided by the shadow determining unit 16 is stored in the memory 63, the determination result which is information indicating whether or not a pixel represents shadow caused by the flash.

Next, the image generating unit 67 selects as the base image one of the plural corrected images stored in the memory 63 (S302). Then, the image generating unit 67 selects as the comparison image one of the remaining corrected images (S303). For example, the image generating unit 67 selects: as the base image a corrected image corresponding to the lighting unit 61a; and as the comparison image a corrected image corresponding to the lighting unit 61b.

Next, the image generating unit 67 determines whether or not a shadow area of the base image is a shadow area of the comparison image (S304). In other words, the image generating unit 67 (i) specifies a pixel, which is determined as shadow by the shadow determining unit 16, out of pixels included in the base image, and further (ii) determines whether or not a pixel, included in the comparison image and located at the same position of the specified pixel in the base image, is determined as shadow by the shadow determining unit 16.

In the case where the pixel specified by the base image does not represent shadow in the comparison image (S304: No), the image generating unit 67 replaces the pixel value of the specified pixel in the base image with the pixel value of the pixel, of the comparison image, located at the same position as the specified pixel in the base image (S305). Then, the image generating unit 67 executes the determination of a shadow area on the next pixel.

In the case where the specified pixel in the base image represents shadow in the comparison image (S304: Yes), the image generating unit 67 executes the determination of shadow area on the next pixel.

After the shadow area determination (S304) and the pixel value replacement (S305) are executed on all the pixels, determination is made to find whether or not there are other corrected images (S306). In the case where other corrected images are found (S306: Yes), the image generating unit 67 selects one of the corrected images as a comparison image (S303). Then, the image generating unit 67 uses the base image and the newly-selected comparison image to execute similar processing. For example, the image generating unit 67 selects a corrected image corresponding to the lighting unit 61c as the newly-selected comparison image.

In the case where there is no other corrected image (S306: No), the image generating unit 67 either provides the obtained base image as the shadow-corrected image, or stores the base image in the memory 63. This is the end of the processing executed by the imaging apparatus 60 in accordance with the embodiment 4.

As described above, the imaging apparatus 60 in accordance with the embodiment 4 sequentially lights the plural lighting units 61a, 61b, and 61c to sequentially obtain continuously-captured images, and generates the corrected image out of the obtained continuously-captured images. In addition, the imaging apparatus 60 cancels the shadow area caused by the use of the plural corrected images to generate a natural image, eliminating effect of the shadow caused by the flash.

It is noted that the image generating unit 67 generates the base image, with a value replaced, as the shadow-corrected image by replacing the pixel value of the pixel included in the base image. Meanwhile, for example, the image generating unit 67 may also generate the shadow-corrected image by selecting, out of the plural corrected images, plural pixels determined not to represent shadow and combining the selected pixels. Here, a pixel of any given corrected image may be selected for a pixel determined to represent shadow in any of the plural corrected images.

The imaging apparatus and the imaging method in accordance with the present invention have been described with reference to the embodiments; however, the present invention shall not be limited to the embodiments. Those skilled in the art will readily appreciate that many modifications are possible in the exemplary embodiments without materially departing from the novel teachings and advantages of this invention. Accordingly, all such modifications are intended to be included within the scope of this invention.

In the imaging apparatus in accordance with the embodiment 1, the color conversion table can be stored in advance. This allows the image generating unit 17 to generate the most suitable color by referring the color conversion table, which eliminates the need for executing an operation with a use of an equation. It is noted here that distance is not necessarily corresponded to the color conversion table.

The color conversion table may correspond a color vector to be a true value to all the values of (i) plural color vectors which are possibly included in an image selected by the color information obtaining unit 14, and (ii) plural color vectors which are possibly included in an image selected by the luminance information obtaining unit 15. By storing color vectors to be true values corresponding to combinations of all the color vectors, the most suitable color vector can be generated, eliminating the need for execution of an operation.

It is noted that the color conversion table does not necessarily correspond the most suitable value to all the pixel values and all sets of the required distance in order to prevent the table from having an enormous amount of data. Selected here may be the most suitable value corresponding to the value closest to each piece of information obtained by the color information obtaining unit 14, the luminance information obtaining unit 15, and the distance obtaining unit 31. Alternatively, each value in the color conversion table may be interpolated to calculate the most suitable value out of the interpolated values.

Moreover, each embodiment involves obtaining and generating a color vector for each pixel; meanwhile, the obtainment and the generation of the color vector may be executed on a block basis which is a group of plural pixels. This can reduce a processing amount.

Further, the flowchart in FIG. 23 of the embodiment 4 shows that image generating unit 67 generates the corrected image every time the image obtaining unit 12 obtains the continuously-captured images. Since this eliminates the need of the memory 63 for storing plural continuously-captured images, the memory 63 can save memory resources. In the case, for example, where a large enough memory area is found in the memory 63, however, the image generating unit 67 may generate the corrected image out of each of the plural continuously-captured images after the image obtaining unit 12 obtains the plural continuously-captured images.

INDUSTRIAL APPLICABILITY

An imaging apparatus and an imaging method in accordance with the present invention are applicable to a digital camera, and in particular, to a digital camera which is capable of eliminating an occurrence of unnatural color and shadow due to effect of a flash, and is able to capture a high-quality and natural image without blur in capturing either in the dark or indoor which requires a flash unit.

REFERENCE SIGNS LIST 10, 30, 50, 60 Imaging apparatus
11, 51, 61a, 61b, 61c Lighting unit
12 Image obtaining unit
13, 32, 63, 111, 120 Memory
14 Color information obtaining unit
15 Luminance information obtaining unit
16 Shadow determining unit
17, 34, 67 Image generating unit
20, 42 Object
31 Distance obtaining unit
33, 202 Color conversion table
41 Ultrasonic wave transmitter and receiver
43 Stereoscopic camera
44 Measured object
52, 62 Lighting control unit
100, 200, 300 Electronics camera
101 Imaging lens
102 Shutter
103 Solid-state imaging device
104 AD converter
105 Timing generating circuit
106 Image processing circuit
107 Memory control circuit
108 Image displaying memory
109 DA converter
110 Image displaying unit
112 Resizing circuit
113 System control circuit
114 Exposure control unit
115 Ranging control unit
116 Zooming control unit
117 Barrier control unit
118 Flash unit
119 Protecting unit
121 Displaying unit
122 Nonvolatile memory
123 Mode dial switch
124 Shutter switch
125 Power source control unit
126, 127, 131, 132 Connector
128 Power source
129, 130 Interface
133 Storing medium
134 Optical viewfinder
135 Communicating unit
136 Antenna
137 Continuous capturing circuit
138 Color information obtaining unit
139 Luminance information obtaining unit
140 Shadow information obtaining unit
141, 204 Color information renewing unit
201 Distance obtaining unit
203 Pixel selecting circuit
301 Flash control circuit

The invention claimed is:

1. An imaging apparatus which emits a flash and photographs an object, said imaging apparatus comprising:
a lighting unit configured to emit the flash to the object;
an image obtaining unit configured to obtain continuously-captured images including a first image and a second image by photographing the object while said lighting unit is emitting the flash, the second image having luminance greater than luminance of the first image;
a color information obtaining unit configured to obtain, from the first image, color information of a first color vector;
a luminance information obtaining unit configured to obtain, from the second image, luminance information of a second color vector; and
an image generating unit configured to generate a corrected image by generating a third color vector corresponding to the color information of the first color vector and the luminance information of the second color vector, the corrected image having luminance greater than the luminance of the first image.

2. The imaging apparatus according to claim 1,
wherein said color information obtaining unit is configured to calculate, based on the first color vector, a unit color vector as the color information,
said luminance information obtaining unit is configured to calculate, based on the second color vector, color vector magnitude as the luminance information, and
said image generating unit is configured to generate a color vector as the third color vector, the color vector being obtained by multiplying the unit color vector by the color vector magnitude.

3. The imaging apparatus according to claim 1,
wherein said color information obtaining unit is configured to select an image having greatest luminance as the first image out of images having luminance equal to a predetermined first threshold value or smaller, the images being included in the continuously-captured images generated by said image obtaining unit.

4. The imaging apparatus according to claim 1,
wherein said luminance information obtaining unit is configured to select an image having a greatest luminance as the second image, the image being included in the continuously-captured images obtained by said image obtaining unit.

5. The imaging apparatus according to claim 1, further comprising
a shadow determining unit configured to determine whether or not a predetermined pixel represents shadow,
wherein said image generating unit is configured to generate the third color vector for a pixel not determined as the shadow by said shadow determining unit.

6. The imaging apparatus according to claim 5,
wherein said shadow determining unit is configured to (i) calculate a ratio of luminance of the predetermined pixel included in the first image to luminance of a pixel included in the second image, and (ii) determine, as the shadow, a pixel having the calculated luminance ratio being equal to a predetermined second threshold value or smaller, the luminance of the pixel included in said second image corresponding to the predetermined pixel.

7. The imaging apparatus according to claim 5,
wherein said shadow determining unit is configured to determine, as the shadow, the predetermined pixel equal to a predetermined third threshold or smaller, the predetermined pixel being included in the first image.

8. The imaging apparatus according to claim 5,
wherein said imaging apparatus includes:
a plurality of lighting units, including said lighting unit, each placed in a different position; and
a control unit configured to sequentially cause said plurality of lighting units to emit flashes,
said image obtaining unit is configured to obtain continuously-captured images each corresponding to an associated one of said plurality of lighting units,
said shadow determining unit is configured to determine whether or not a predetermined pixel represents the shadow for each of the continuously-captured images, and
said image generating unit is configured to generate the corrected image for each of the continuously-captured images, and further (i) specify a pixel determined (a) as the shadow in a first corrected image included in the generated plurality of the corrected images, and (b) not as the shadow in a second corrected image included in the generated plurality of the corrected images, and (ii) generate a shadow-corrected image of which pixel, determined as the shadow, has been corrected, so that a pixel value of the specified pixel is a pixel value of a pixel included in the second corrected image, the first corrected image representing one of the generated plurality of the corrected images and the second corrected image representing another one of the generated plurality of the corrected images.

9. The imaging apparatus according to claim 8,
wherein said image generating unit is configured to (i) replace the pixel value of the specified pixel out of a plurality of pixels included in the first corrected image with the pixel value of the pixel included in the second corrected image, and (ii) generate the first corrected image as the shadow-corrected image, the first corrected image having the pixel value been replaced.

10. The imaging apparatus according to claim 9,
wherein said image generating unit is configured to (i) sequentially select each of all the plurality of the corrected images except the first corrected image as the second corrected image, and (ii) specify the pixel determined as (a) the shadow in the first corrected image, and (b) not as the shadow in the selected second corrected image.

11. The imaging apparatus according to claim 1, further comprising
a storing unit configured to store a color conversion table in which a plurality of color vectors to be possibly included in the first image, a plurality of color vectors to be possibly included in the second image, and the plurality of the third color vectors correspond each other,
wherein said image generating unit is configured to generate, for each pixel, a third color vector corresponding to the first color vector and the second color vector by referring to the color conversion table.

12. The imaging apparatus according to claim 1, further comprising
a distance obtaining unit configured to obtain distance between said imaging apparatus and the object,
wherein said image generating unit is further configured to generate a corrected image having luminance greater than the luminance of the first image by correcting the third color vector with a use of the distance obtained by said distance obtaining unit.

13. The imaging apparatus according to claim 12, further comprising
a storing unit configured to store a color conversion table corresponding, each other, a plurality of sets of distance to the object, a plurality of color vectors to be possibly included in the first image, a plurality of color vectors to be possibly included in the second image, and the plurality of the third color vectors,
wherein said image generating unit is configured to generate the corrected image by referring to the color conversion table to generate, for each pixel, the third color vector corresponding to the plurality of the sets of the distance to the object, the first color vector, and the second color vector.

14. The imaging apparatus according to claim 12,
wherein said distance obtaining unit is configured to obtain (i) first distance to the object in a pixel having a luminance value to be referenced, and (ii) second distance to the object in a target pixel, and
said image generating unit is configured to generate the corrected image having luminance greater than the luminance of the first image by multiplying the third color vector by a square of a ratio of the first distance to the second distance.

15. The imaging apparatus according to claim 1,
wherein said lighting unit is configured to emit flashes at least twice, the flashes each being different in amount of light,
said image obtaining unit is configured to obtain the first image and the second image by photographing the object for each emitting of the flash, and
the second image has a smaller amount than the first image in the flash.

16. An imaging method for emitting a flash and photographs an object, said imaging method comprising:
emitting the flash to the object;
obtaining continuously-captured images including a first image and a second image by photographing the object while the flash is being emitted in said emitting, the second image having luminance greater than luminance of the first image;
obtaining color information of a first color vector from the first image;
obtaining luminance information of a second color vector from the second image; and
generating a corrected image by generating a third color vector corresponding to the color information of the first color vector and the luminance information of the second color vector, the corrected image having luminance greater than the luminance of the first image.

17. A non-transitory computer readable medium storing a program to cause a computer to execute an imaging method for emitting a flash and photographing an object, said program comprising:
controlling a lighting unit which emits the flash to the object;

obtaining continuously-captured images including a first image and a second image by photographing the object while the flash is being emitted in said emitting, the second image having luminance greater than luminance of the first image;

obtaining color information of a first color vector from the first image;

obtaining luminance information of a second color vector from the second image; and generating a corrected image by generating a third color vector corresponding to the color information of the first color vector and the luminance information of the second color vector, the corrected image having luminance greater than the luminance of the first image.

* * * * *